US008703502B2

(12) United States Patent
Chan et al.

(10) Patent No.: US 8,703,502 B2
(45) Date of Patent: Apr. 22, 2014

(54) ANALYTE IONIZATION BY CHARGE EXCHANGE FOR SAMPLE ANALYSIS UNDER AMBIENT CONDITIONS

(75) Inventors: Chang-Ching Chan, East Brunswick, NJ (US); Mark S. Bolgar, Ewing, NJ (US); Scott A. Miller, Bridgewater, NJ (US); Athula Buddhagosha Attygalle, Hoboken, NJ (US)

(73) Assignee: The Trustees of the Stevens Institute of Technology, Hoboken, NJ (US)

( * ) Notice: Subject to any disclaimer, the term of this patent is extended or adjusted under 35 U.S.C. 154(b) by 287 days.

(21) Appl. No.: 12/893,597

(22) Filed: Sep. 29, 2010

(65) Prior Publication Data

US 2011/0165695 A1 Jul. 7, 2011

Related U.S. Application Data

(60) Provisional application No. 61/246,633, filed on Sep. 29, 2009, provisional application No. 61/319,502, filed on Mar. 31, 2010, provisional application No. 61/381,352, filed on Sep. 9, 2010.

(51) Int. Cl.

| | |
|---|---|
| ***G01N 1/28*** | (2006.01) |
| ***G01N 1/44*** | (2006.01) |
| ***G01N 1/22*** | (2006.01) |
| ***H01J 49/26*** | (2006.01) |

(52) U.S. Cl.
USPC .......................................... 436/173; 436/177

(58) Field of Classification Search
USPC ................................. 436/173, 174, 177, 178
See application file for complete search history.

(56) References Cited

U.S. PATENT DOCUMENTS

| | | | |
|---|---|---|---|
| 5,103,093 | A | 4/1992 | Sakairi et al. |
| 5,580,434 | A | 12/1996 | Robotti et al. |
| 6,118,120 | A | 9/2000 | Fenn et al. |
| 6,188,065 | B1 | 2/2001 | Takada et al. |
| 6,236,042 | B1 | 5/2001 | Kato et al. |
| 6,252,225 | B1 | 6/2001 | Takada et al. |
| 6,278,111 | B1 | 8/2001 | Sheehan et al. |
| 6,297,499 | B1 | 10/2001 | Fenn |
| 6,350,617 | B1 | 2/2002 | Hindsgaul et al. |
| 6,452,166 | B1 | 9/2002 | Enke et al. |
| 6,596,988 | B2 | 7/2003 | Corso et al. |
| 6,642,515 | B1 | 11/2003 | Yamaguchi |
| 6,949,741 | B2 | 9/2005 | Cody et al. |
| 7,015,466 | B2 | 3/2006 | Takats et al. |
| 7,335,897 | B2 | 2/2008 | Takats et al. |
| 7,544,933 | B2 | 6/2009 | Cooks et al. |

(Continued)

OTHER PUBLICATIONS

Jackson, Ayanna U. et al. "Direct analysis of Stevia leaves for diterpene glycosides by desorption electrospray ionization mass spectrometry." Analyst (2009) 134 867-874.*

(Continued)

*Primary Examiner* — Christopher A Hixson
(74) *Attorney, Agent, or Firm* — Greenberg Traurig, LLP

(57) ABSTRACT

Electrospray ionization techniques are used to generate reagents that ionize analytes for mass spectrometric analysis by charge transfer. Such techniques may be performed under ambient conditions. Suitable precursors for such reagents include ionizable nonpolar solvents, such as toluene or xylenes, polar solvents, such as water or alcohols, inert gases, such as helium or nitrogen, or combinations thereof. Environmental conditions in the ionization chamber of the mass spectrograph can be manipulated to generate a selected ion of an analyte in preference to other ions.

15 Claims, 25 Drawing Sheets

(56) References Cited

U.S. PATENT DOCUMENTS

| | | | | |
|---|---|---|---|---|
| 2007/0187589 | A1 | 8/2007 | Cooks et al. | |
| 2008/0067352 | A1 | 3/2008 | Wang | |
| 2008/0087811 | A1 * | 4/2008 | Knapp | 250/282 |
| 2008/0159685 | A1 | 7/2008 | Venter et al. | |
| 2008/0173809 | A1 | 7/2008 | Wu | |
| 2009/0309020 | A1 | 12/2009 | Cooks et al. | |
| 2010/0193702 | A1 | 8/2010 | Li et al. | |

OTHER PUBLICATIONS

Nefliu, MArcela et al. "Desorption electrospray ionization and electrosonic spray ionization for solid- and solution-phase analysis of industrial polymers." Chem. Commun. (2006) 888-890.*

International Patent Application No. PCT/US2010/050725, filed Sep. 29, 2010, entitled "Analyte Ionization by Charge Exchange for Sample Analysis Under Ambient Conditions".

Cotte-Rodriguez et al., "Desorption Electrospray Ionization of Explosives on Surfaces: Sensitivity and Selectivity Enhancement by Reactive Desorption Electrospray Ionization", Analytical Chemistry, vol. 77, No. 21, Nov. 1, 2005, pp. 6755-6764.

Wu et al., "Rapid Direct Analysis of Cholesterol by Charge Labeling in Reactive Desorption Electrospray Ionization", Analytical Chemistry, vol. 81, No. 18, Sep. 15, 2009, pp. 7618-7624.

International Search Report and Written Opinion regarding International (PCT) Application No. PCT/US2010/050725, mailed May 27, 2011.

Jackson, et al., "Direct analysis of Stevia leaves for diterpene glycosides by desorption electrospray ionization mass spectrometry", Analyst (2009) 134 867-874.

Nefliu et al., "Desorption electrospray ionization and electrosonic spray ionization for solid- and solution-phase analysis of industrial polymers", Chem. commun (2006) 888-890.

Cody et al., "Versatile new ion source for the analysis of materials in open air under ambient conditions", Analytical Chemistry (2005) vol. 77, pp. 2297-2302.

Attygalle et al., "Mild route to generate gaseous metal anions", Rapid Commun. Mass Spectrom., vol. 25, (2011) pp. 681-688.

Coon et al., "Anion dependence in the partitioning between proton and electron transfer in ion/ion reactions", International Journal of Mass Spectrometry, vol. 238 (2004) pp. 33-42.

Kebarle, "A brief overview of the present status of the mechanisms involved in electrospray mass spectrometry", Journal of Mass Spectrometry, vol. 35 (2000), pp. 804-817.

Kebarle et al., "On the mechanisms by which the charged droplets produced by electrospray lead to gas phase ions", Analytica Chimica Acta, vol. 406, (2000), pp. 11-35.

Labowsky et al., "A continuum model for ion evaporation from a drop: effect of curvature and charge on ion solvation energy", Analytica Chimica Acta, vol. 406 (2000) pp. 105-118.

Syka et al., "Peptide and protein sequence analysis by electron transfer dissociation mass spectrometry", PNAS, vol. 101, No. 26 (Jun. 29, 2004), pp. 9528-9933.

Wang et al.; "Charged residue versus ion evaporation for formation of alkali metal halide cluster ions in ESI", Analytica Chimica Acta, vol. 406, (2000), pp. 53-65.

Non-Final Office Action for U.S. Appl. No. 13/599,785, mailed Jan. 10, 2013.

European Office Action dated Feb. 6, 2013 for EP Application No. 10 763 110.3.

Chan, C. et al., Desorption Ionization by Charge Exchange (DICE) for Sample Analysis under Ambient Conditions by Mass Spectrometry, J. Am. Soc. Mass Spectrom. (May 5, 2010) 21, 1554-1560.

Chan, C. et al., Evading Metal Adduct Formation during Desorption-Ionization Mass Spectrometry, Rapid Commun. Mass Spectrom. (2010) 24, 2838-2842.

Chan, C. et al., A Combined Desorption-Ionization by Charge Exchange (DICE) and Desorption-Electrospray Ionization (DESI) Source for Mass Spectroscopy (accepted for publication in J. Am. Soc. Mass Spectrom), (submitted to PTO Dec. 23, 2010).

Effects of Solvent, Leaving Group, and Nucleophile on Unimolecular Substitution; http://chemwiki.ucdavis.edu/Organic_Chemistry/Reactions/SN1_Reaction/Effects_of_Solvent,_Leaving_Group,_and_Nucleophile_on_Unimolecular_Substitution; printed May 15, 2013, 5 pages.

Molecular ion; http://mass-spec.Isu.edu/msterms/index/php/Molecular_ion; printed Aug. 7, 2013, 3 pages.

* cited by examiner

ANALYTE IONIZATION BY CHARGE EXCHANGE FOR SAMPLE ANALYSIS UNDER AMBIENT CONDITIONS

CROSS-REFERENCE TO RELATED APPLICATIONS

The present application claims benefit of U.S. Provisional Patent Application No. 61/246,633, filed on Sep. 29, 2009, U.S. Provisional Patent Application No. 61/319,502, filed on Mar. 31, 2010, and U.S. Provisional Patent Application No. 61/381,352, filed on Sep. 9, 2010, all of which are incorporated by reference herein in their entireties.

STATEMENT REGARDING FEDERALLY FUNDED RESEARCH

Not applicable.

FIELD OF THE INVENTION

This invention pertains to the field of sample characterization, especially with regard to mass spectroscopy, through the generation of gaseous ions by methods involving electrospray ionization techniques and desorption of analytes from surfaces by spray techniques.

BACKGROUND OF THE INVENTION

Recent developments in ambient desorption ionization techniques, such as desorption electrospray ionization (hereinafter, "DESI") and direct analysis in real time (hereinafter, "DART"), have opened new routes for characterizing a wide range of compounds, such as proteins, explosives, polymers, pharmaceuticals and metabolites amenable to mass spectrometry, with little or no sample preparation. In addition, DESI techniques (such as that disclosed in U.S. Pat. No. 7,335,897, the disclosure of which is incorporated by reference herein) have been extended to biological imaging as well. The ionization mechanisms of both DESI and DART correlate to those of at least two other sample ionization techniques. For example, the DESI technique is a modification of the well-known electrospray ionization (hereinafter, "ESI") method, whereas the DART technique is related to the well-known direct atmospheric pressure ionization (hereinafter, "DAPCI") procedure. In the ESI-related DESI technique, analytes are desorbed from a sample surface. Desorption takes place mainly through momentum transfer from charged solvent droplets, although other processes also occur (e.g., volatilization, reactive ion/surface collisions, and charge transfer from even-electron ions). In contrast, DAPCI-related desorption techniques mainly desorb analytes by momentum transfer from uncharged droplets, with ionization taking place after desorption.

Despite the major breakthroughs of sample analysis provided by DESI and DART, both techniques have some limitations. The DART technique can be applied primarily to low-molecular-weight samples (i.e., samples having molecular weights of less than about 1 kiloDaltons (kDa)) and has a very limited dynamic range. The DESI technique, in contrast, can ionize samples having molecular weights as high as 66 kDa and has a high dynamic range of about 1000. However, DESI is a highly inefficient technique for generating ions, from molecules of low polarity. Even polar molecules such as cholesterol and 1,4-hydroquinone are poorly ionized by DESI methods in positive mode. Further, DESI methods regularly produce protonated or sodiated molecular ions or fragments, complicating interpretation of mass spectrographs.

SUMMARY OF THE INVENTION

Desorption ionization by charge exchange (hereinafter, "DICE") generates ions from molecules of low polarity. In an embodiment of the invention, a DICE-reagent spray is generated by passing any low-polarity solvent that can be electrochemically oxidized, which may include mixtures of such low-polarity solvents, through an electrically-conductive capillary (e.g., a metal capillary) held at a high voltage (e.g., 5 kV or greater). The spray is nebulized by pneumatic assistance provided by a stream of chemically-inert gas directed coaxially with the flow of the solvent. The resulting spray comprises fluid droplets containing molecular ions of the solvent. Analytes are then desorbed and ionized as the DICE-reagent spray is brought into contact with the analytes on a surface (e.g., a needle tip). Although normal sample preparation techniques may be used, the DICE method can be usefully implemented by directing the DICE-reagent spray onto a surface of the material to be analyzed without prior sample preparation. The DICE process is performed under ambient conditions at pressures of nominally one standard atmosphere.

In another embodiment of the invention, the low polarity solvent is combined with one or more high-polarity solvents, such as those used to form DESI-reagent sprays. The combined solvents are then passed through the electrically-conductive capillary at a high voltage to form a combined DICE-DESI reagent spray. Such a combined with spray can be used to characterize a broader range of analytes than either a DICE-reagent spray or a DESI-reagent spray alone.

In another aspect of the invention, metastable helium is generated using techniques similar to those used in electrospray ionization. Applying the metastable helium to an analyte in the vapor phase generates molecular anions characteristic of the analyte. Environmental conditions, such as gas composition and temperature, can be manipulated to promote generation of selected molecular ions in preference to others.

BRIEF DESCRIPTION OF THE DRAWINGS

For a better understanding of the present invention, reference is made to the following detailed description of the exemplary embodiments considered in conjunction with the accompanying drawings, in which.

DETAILED DESCRIPTION OF THE INVENTION

Figure 1:
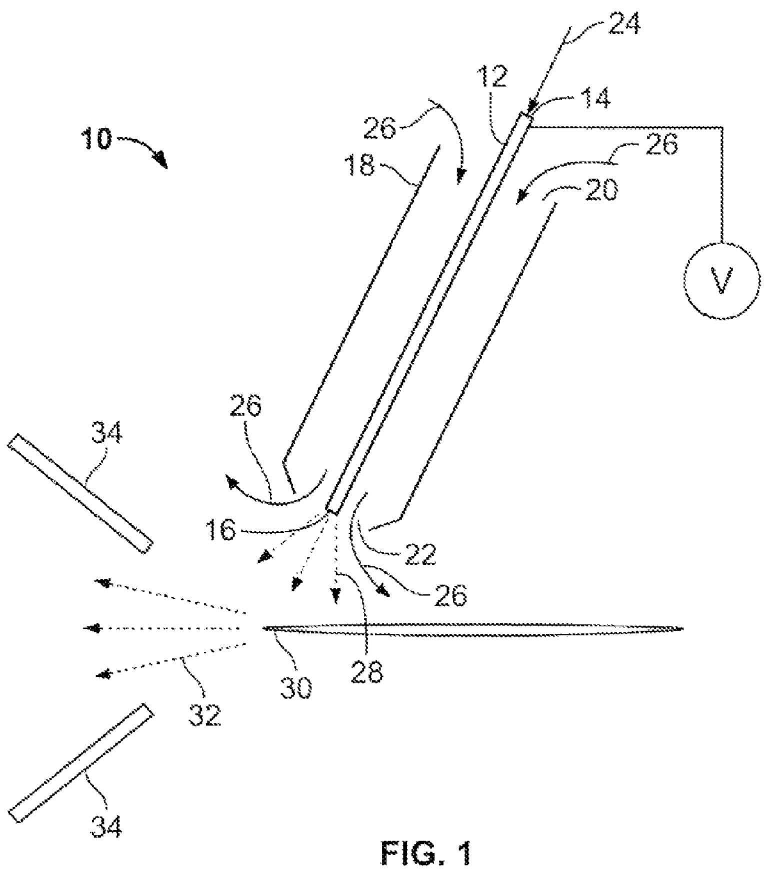
FIG. 1 is a schematic view of a first apparatus, suitable for use with a DICE technique according to an embodiment of the present invention.

FIG. 1 is a schematic view of an ESI-based apparatus 10 suitable for use with a DICE technique according to an embodiment of the present invention or with a DESI-like technique. The apparatus 10 is also suitable for use with combined DICE-DESI techniques with a simple modification discussed elsewhere herein. The apparatus 10 comprises a modification of an ESI nozzle known in the art. An electrically-conductive capillary 12 (e.g., a metal capillary) has an inlet 14 and an outlet 16. The outlet 16 of the capillary 12 is situated within a nebulizer tube 18 having a respective inlet 20 and outlet 22. In the embodiment of the apparatus illustrated in FIG. 1, the capillary 12 is substantially concentric within the nebulizer tube 18, with the outlet 16 of the capillary 12 proximate the outlet 22 of the nebulizer tube 18. In a typical apparatus 10, the capillary 12 is made of metal, and has a length of about 100 mm, an inner diameter of about 100-130 μm and an outer diameter of about 230 μm. The nebulizer tube 18 has an inner diameter of about 4 mm along much of its length, but narrows considerably near its discharge end.

The following embodiment of the invention is discussed in relation to the DICE technique. DESI-like and combined DICE-DESI techniques would be performed in a similar manner, with variations discussed elsewhere herein. In the aforementioned embodiment of a DICE technique, a DICE reagent, indicated in FIG. 1 by arrow 24, is injected into the inlet 14 of the capillary 12, which is held at a high electrical potential (e.g., a voltage of about 5 kV) provided by a voltage source V. In an embodiment of the present invention, the DICE reagent 24 comprises one or more solvents of low polarity, at least one of which undergoes electrochemical oxidation on the surface of the capillary 12 to produce molecular ions of the electrochemically-oxidizable solvent in the DICE reagent 24. Suitable low-polarity electrochemically-oxidizable solvents include, but are not limited to, solvents comprising aromatic hydrocarbons, such as benzene, toluene, all xylene isomers, all trimethyl benzene isomers, or furans, and additives such as fullerene or fluoranthene. Given the disclosures of the present application, other suitable solvents and additives will be recognized by those having ordinary skill in the art of electrochemistry.

Continuing the discussion of the present embodiment, a chemically-inert gas (such as nitrogen), indicated in FIG. 1 by arrows 26, is injected into the inlet 20 of the nebulizer tube 18. The apparatus 10 is arranged such that the gas 26 exits the outlet 22 of the nebulizer tube 18 at a sufficient velocity to nebulize the electrochemically-oxidized DICE reagent 24 as it exits the outlet 16 of the capillary tube 12, thereby forming a DICE-reagent spray, indicated in FIG. 1 by arrows 28. The DICE-reagent spray 28 is a spray largely comprised of small liquid droplets containing molecular ions of the electrochemically-oxidizable solvent. Further, some of the DICE reagent 24 may evaporate producing gaseous molecular ions of the electrochemically-oxidized solvent, which are part of the DICE-reagent spray 28.

The nebulizing gas 26 imparts momentum to the droplets in the DICE spray 28, which impinge on a target surface 30. Analytes from the target surface 30 become electrically charged and are desorbed from the target surface 30 by the liquid droplets in the DICE-reagent spray 28. The momentum of the droplets causes them to rebound from the target surface 30, carrying desorbed analytes. Some portion of the analytes may also desorb as gases. At least some of the droplets of the DICE reagent spray, indicated by the arrows 32, are captured by the atmospheric interface 34 (also referred to as a "cone") of a mass spectrometer (not shown).

Without being bound by theory, it is believed that analytes from the target surface 30 are ionized by charge exchange from molecular ions formed by the electrochemical oxidation of the DICE reagent 24. The DICE-reagent spray 28 is generated by an ESI-like process, however, the actual ionization of analytes may take place in both gaseous and liquid phases by charge exchange processes similar to those observed for chemical ionization. The DICE technique thus may have characteristics of both ESI and APCI techniques.

The following examples, discussed with reference to the mass spectra of FIGS. 2-25, demonstrate some of the capabilities of the DICE techniques and combined DICE-DESI techniques. For these examples, an apparatus such as apparatus 10 of FIG. 1 was used to generate reagent sprays of DICE and/or DESI-like reagents to desorb and capture analytes. The procedures used are discussed in more detail hereinbelow.

Characterization of Analytes Using a DICE Technique

For the examples discussed with relation to FIGS. 2-12, a DICE-reagent spray was formed from toluene using a device of the same type as apparatus 10. Toluene was infused at a flow rate of 10-50 μL/min to a capillary having a diameter of about 100 μm while the capillary was held at a voltage of 5 kV. Nitrogen was used as the nebulizing gas, with a set flow rate of 75 L/hr and a set temperature of 350° C. All of the experiments to which FIGS. 2-12 are related were conducted using a Waters Quattro Micro triple quadrupole mass spectrometer (Milford, Mass., USA), with the cone voltage set at 25 V. No cone gas was applied. The source temperature was kept at 125° C. Analytes were deposited in solution on the target surface, which was braided steel wire, over an area of about 44 $mm^2$ and air-dried. Incident and collection angles in the ion source region were each set at approximately 80°.

Figure 2:
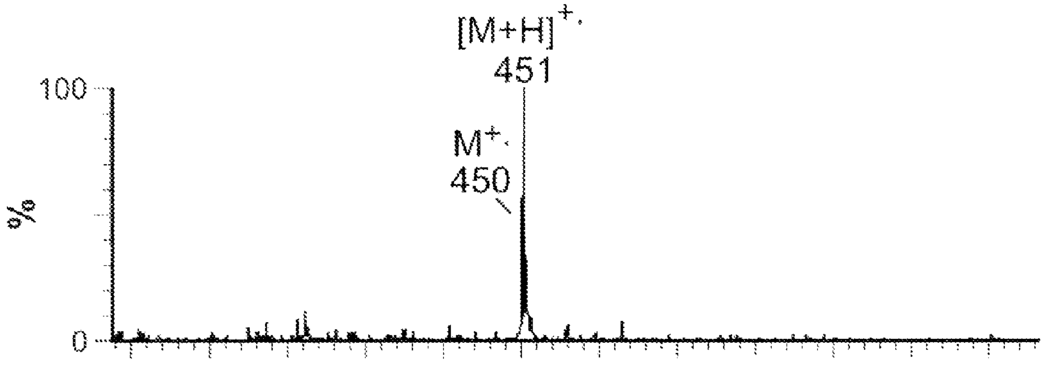
FIG. 2 shows a mass spectrum of vitamin K, generated using a DICE technique according to an embodiment of the present invention.

Turning to the experimental results, FIG. 2 shows a mass spectrum of vitamin K, generated using a DICE-reagent spray formed as described above. The peak at m/z 451 is indicative of the protonated vitamin K molecule $[M+H]^+$ and the peak at m/z 450 is indicative of the corresponding molecular cation $M^{+*}$. In contrast, a DESI-like mass spectrum of vitamin K (not shown) would show a peak only for the protonated vitamin K molecule $[M+H]^+$. The observation of two peaks for vitamin K suggests that there may be at least two ionization mechanisms that occur simultaneously during the DICE procedure. Without being bound by theory, the $[M+H]^+$ ions may be associated with a DAPCI-like phenomenon process, whereas the molecular ions $M^{+*}$ of vitamin K are probably produced by a reaction specific to the DICE technique.

Figure 3:
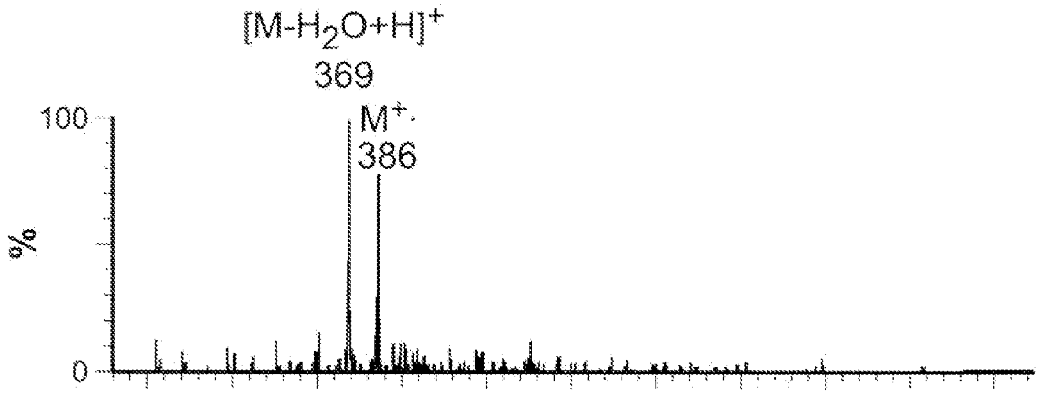
FIG. 3 shows a mass spectrum of cholesterol, generated using a DICE technique according to an embodiment of the present invention.

FIG. 3 shows a mass spectrum of cholesterol, generated using a DICE technique according to an embodiment of the present invention. This DICE-generated spectrum of cholesterol is distinctive because it is very different from those generated by DAPCI or DESI-like techniques (spectra not shown). Neither DAPCI nor DESI-like techniques produce peaks for the positive molecular ion $M^{+*}$ (m/z 386). In fact, DESI-like techniques do not produce any significant signals at all for cholesterol in positive mode. A DAPCI spectrum of cholesterol would show a peak only for the dehydrated species derived from the protonated cholesterol, $[M-H_2O+H]^+$ (m/z 369). DICE techniques, on the other hand, produce the aforesaid molecular ion $M^{+*}$ of cholesterol, as well as the aforesaid protonated cholesterol $[M-H_2O+H]^+$.

Figure 4:
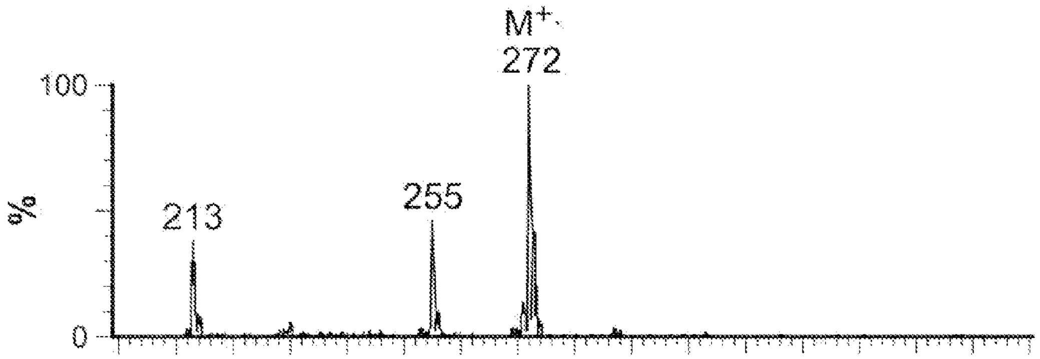
FIG. 4 shows a mass spectrum of estradiol, generated using a DICE technique according to an embodiment of the present invention.

DICE techniques can also produce additional fragmentation information beyond the formation of molecular ions for the identification of target compounds. FIG. 4 shows a mass spectrum of estradiol, generated using a DICE technique according to an embodiment of the present invention. The spectrum shows peaks for neutral losses of propanol (m/z 213) and water (m/z 255) from protonated estradiol, as well as the characteristic peak for the molecular ion of estradiol $M^{+*}$ (m/z 272), even though the test was performed under very mild conditions. Thus, DICE techniques can provide additional information beyond the formation of molecular ions for identification of a target compound without having to resort to additional ion activation.

Figure 5:
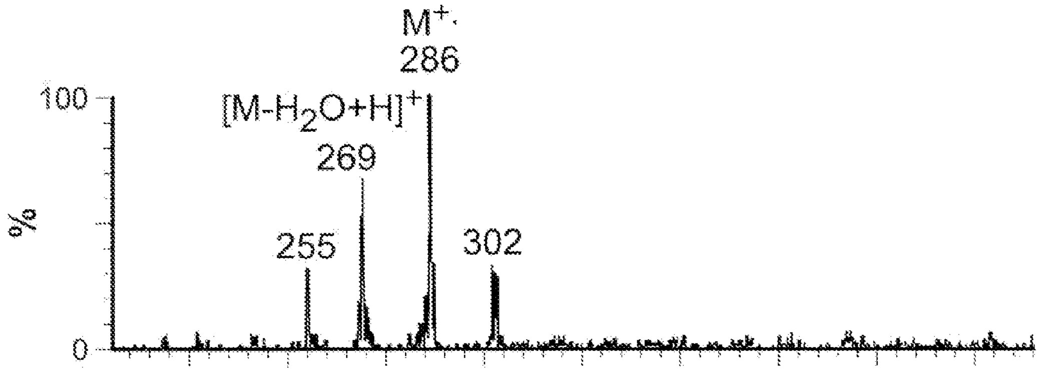
FIG. 5 shows a mass spectrum of vitamin A, generated using a DICE technique according to an embodiment of the present invention.

FIG. 5 shows a mass spectrum of vitamin A, generated using a DICE technique according to an embodiment of the present invention. The mass spectrum shows fragment peaks together with the characteristic peak for the molecular ion $M^{+*}$ (m/z 286). The peaks observed at m/z 269 and 255 represent neutral losses of water and methanol, respectively, from the protonated molecule $[M+H]^+$, for which no peak is observed.

Figure 6:
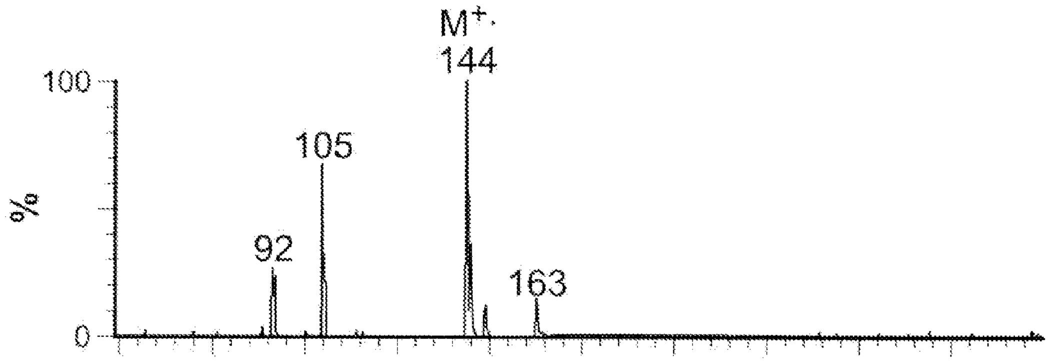
FIG. 6 shows a mass spectrum of β-naphthol, generated using a DICE technique according to an embodiment of the present invention.
Figure 7:
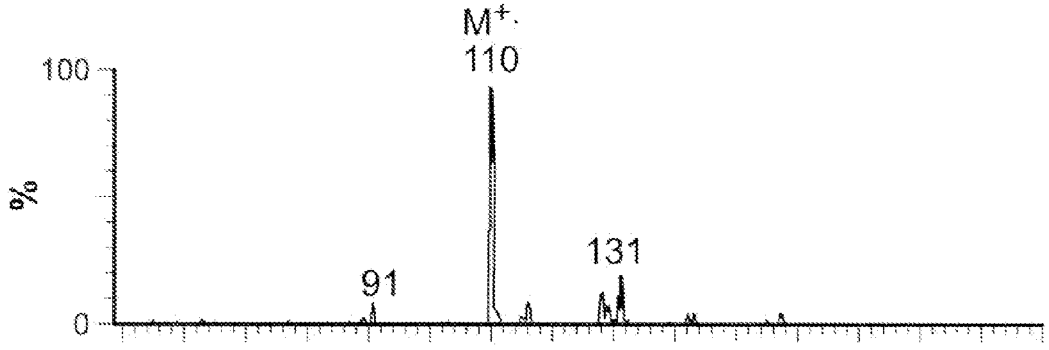
FIG. 7 shows a mass spectrum of hydroquinone, generated using a DICE technique according to an embodiment of the present invention.
Figure 8:
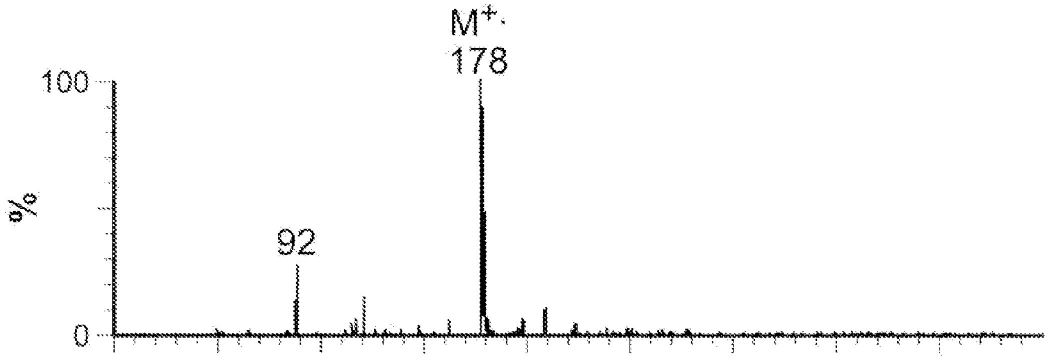
FIG. 8 shows a mass spectrum of anthracene, generated using a DICE technique according to an embodiment of the present invention.
Figure 9:
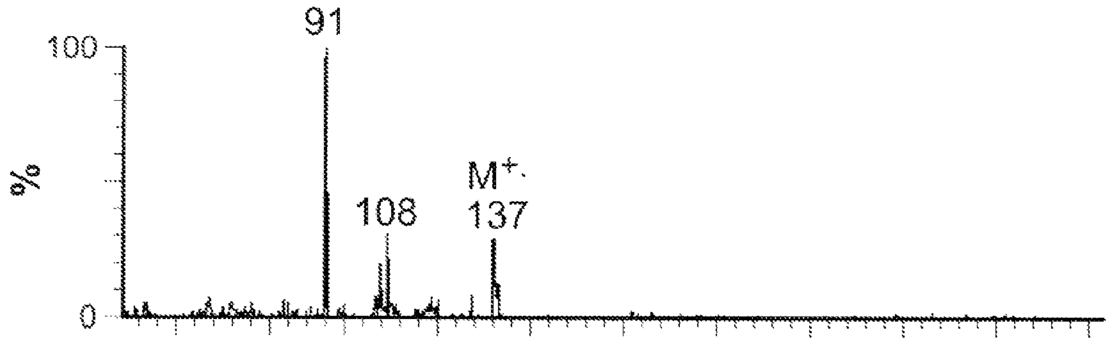
FIG. 9 shows a mass spectrum of p-aminobenzoic acid, generated using a DICE technique according to an embodiment of the present invention.

Polar compounds usually generate gaseous ions abundantly when subjected to ESI. However, some polar compounds, such as naphthol and hydroquinone, and some non-polar compounds, such as anthracene, are known to be ionized poorly by ESI in positive mode. Gaseous ions from several analytes that are known to be challenging for ESI-related methods were generated using a DICE method according to an embodiment of the present invention. The resulting mass spectra are shown in FIGS. 6 to 8. In all of the spectra, good signal-to-noise ratios of better than about 50:1 were achieved.

FIG. 6 shows a mass spectrum of β-naphthol, generated using a DICE technique according to an embodiment of the present invention. A dominant molecular ion $M^{+*}$ peak can be seen at m/z 144.

FIG. 7 shows a mass spectrum of hydroquinone, generated using a DICE technique according to an embodiment of the present invention. A dominant molecular ion $M^{+*}$ peak can be seen at m/z 110.

FIG. 8 shows a mass spectrum of anthracene, generated using a DICE technique according to an embodiment of the present invention. A dominant molecular ion $M^{+*}$ peak can be seen at m/z 178.

Figure 10:
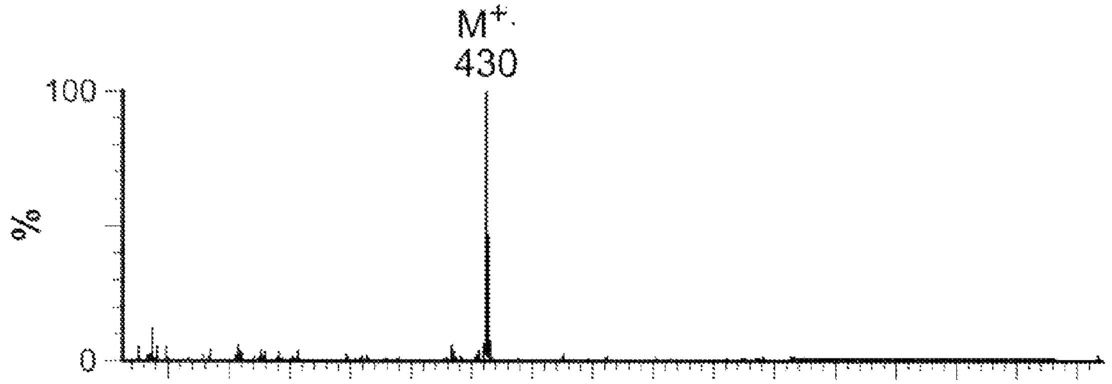
FIG. 10 shows a mass spectrum of α-tocopherol, generated using a DICE technique according to an embodiment of the present invention.

Polar analytes can also be ionized using a DICE technique according to an embodiment of the present invention. For example, the signal intensity ratio of molecular ion $M^{+*}$ to protonated molecule $[M+H]^+$ for the polar compound p-aminobenzoic acid (m/z 137) (FIG. 9) was similar to the ratio obtained for the less polar α-tocopherol (m/z 430) (FIG. 10). The signal from the protonated molecule $[M+H]^+$ is not readily visible in either figure, although it is believed that examination of a higher resolution spectrum (not shown) would clearly reveal its presence adjacent to the molecular ion $M^{+*}$ peak. This observation suggests that the charge exchange mechanism is effective in both polar and non-polar analytes.

Figure 11:
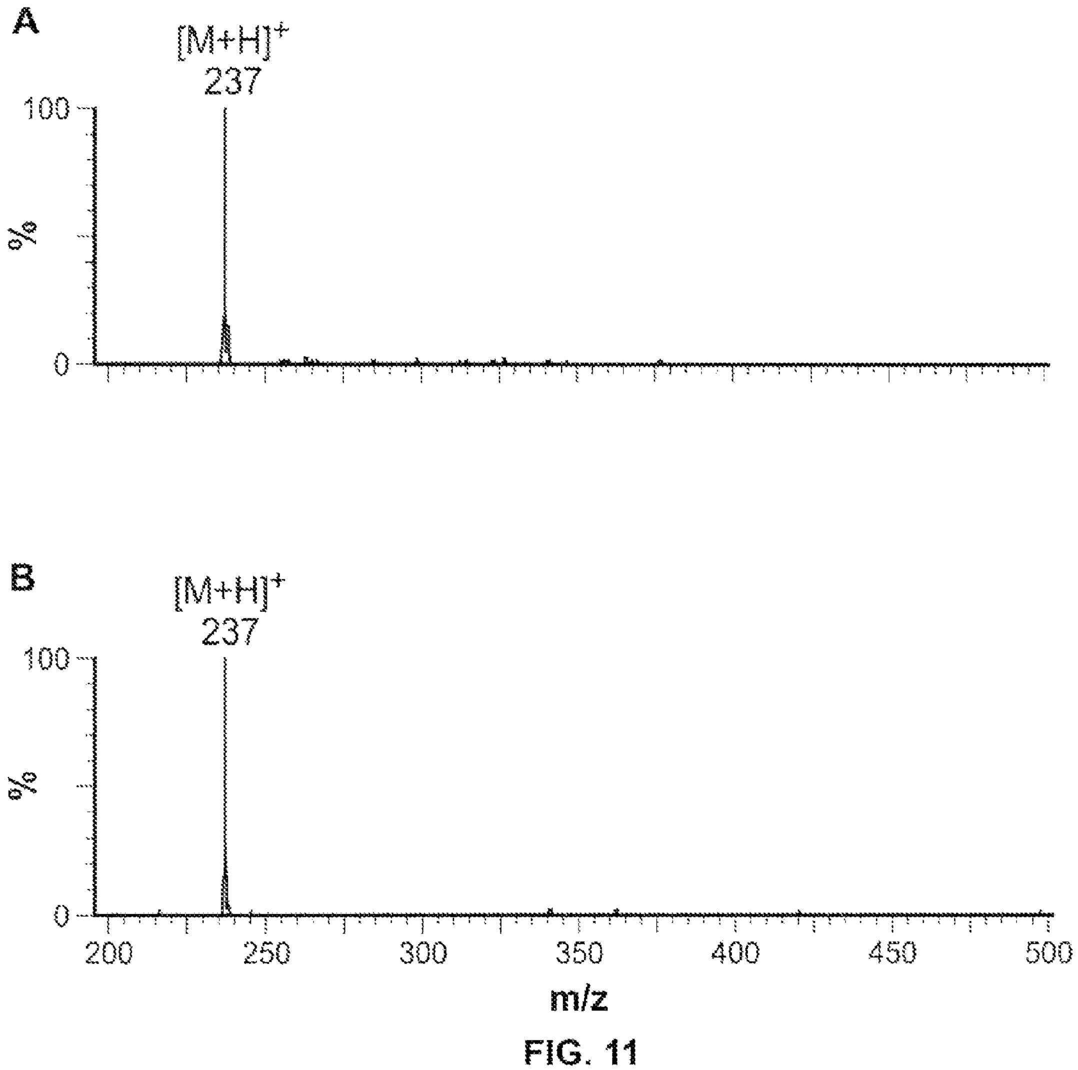
FIG. 11 shows comparative mass spectra of carbamazepine in the presence of mineral salts and in the absence of mineral salts, the mass spectra having been generated using a DICE technique according to an embodiment of the present invention.

It is known that the presence of metallic ions in a sample can suppress the mass spectral signal and cause other undesirable spectral complications. The use of a DICE technique can significantly reduce or eliminate formation of metal adducts without addition of chemical modifiers to the spray. Turning to FIG. 11, 600 ng of carbamazepine in a 2% solution of sodium and potassium chlorides was applied to a first filter paper, and 600 ng of carbamazepine without added mineral salts was applied to a second filter paper. Both carbamazepine samples were analyzed using the exemplary DICE technique. As shown in FIG. 11, both mass spectrum A, obtained for the sample with mineral salt, and mass spectrum B, obtained for the sample without mineral salt, showed a single strong peak at m/z 237, corresponding to the protonated molecular ion $[M+H]^+$. There were no peaks for sodium or potassium adducts of the molecule, indicating that use of a DICE-reagent spray did not result in the formation of metal adducts. However, although not evident from the mass spectra A and B, which are scaled to different signal intensities, the sample that was prepared with the sodium and potassium salts had a signal that was roughly one-fifth as intense as the signal for the sample that did not include a mineral salt, indicating that some suppression of the signal intensity occurs in the presence of salts, even when a DICE technique is employed.

Figure 12:
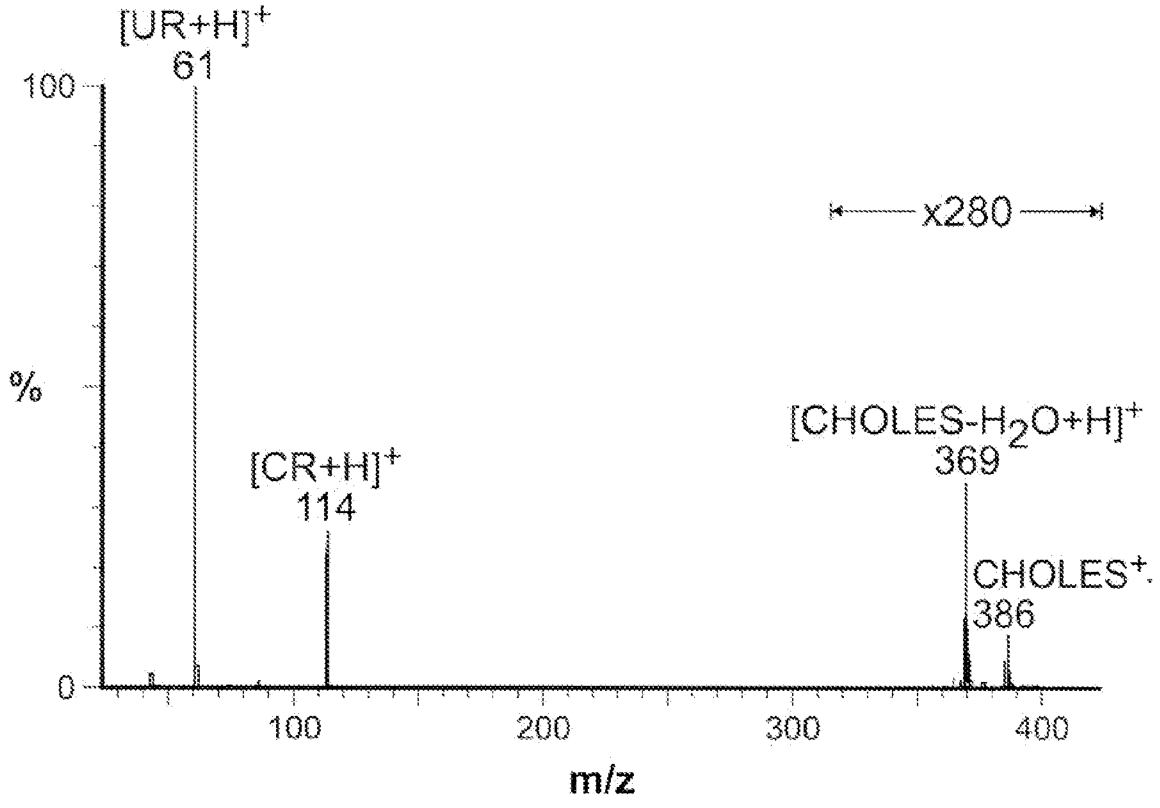
FIG. 12 shows a mass spectrum of urea, creatinine and cholesterol from a urine sample spiked with cholesterol, the mass spectrum having been generated using a DICE technique according to an embodiment of the present invention.

In order to evaluate the applicability of the DICE techniques for determining analytes in high-salt physiological fluids, a cholesterol-spiked urine sample from a healthy human volunteer was examined. Prior work using DESI-reagent spray (Takats, Z. et al., J. Mass Spectrom, 2005, 40, 1261) produced a mass spectrum for urine showing intense peaks for potassium cation (m/z 39), sodiated urea (m/z 83), potassiated urea (m/z 99), protonated creatinine (m/z 114), sodiated creatinine (m/z 136) and potassiated creatinine (m/z 152). A peak for protonated urea (m/z 61) was also present. As shown in FIG. 12, the mass spectrum for cholesterol-spiked urine generated using DICE-reagent spray is much simpler. Major peaks are present at m/z 61 for the protonated molecular ion of urea $[UR+H]^+$ and at m/z 114 for the protonated molecular ion of creatinine $[CR+H]^+$. Major peaks are also present at m/z 386 and m/z 369 for the molecular ion of cholesterol $CHOLES^{+*}$ and the protonated dehydrated molecular ion of cholesterol $[CHOLES\text{-}H_2O+H]^+$, respectively. The few other peaks present in the mass spectrum are of negligible intensity. Thus, the use of DICE-reagent spray appears to be a practical method for the analysis of high-salt biological samples, such as urine.

Comparison of Analyte Characterizations Using DICE Versus DESI Techniques

Figure 13:
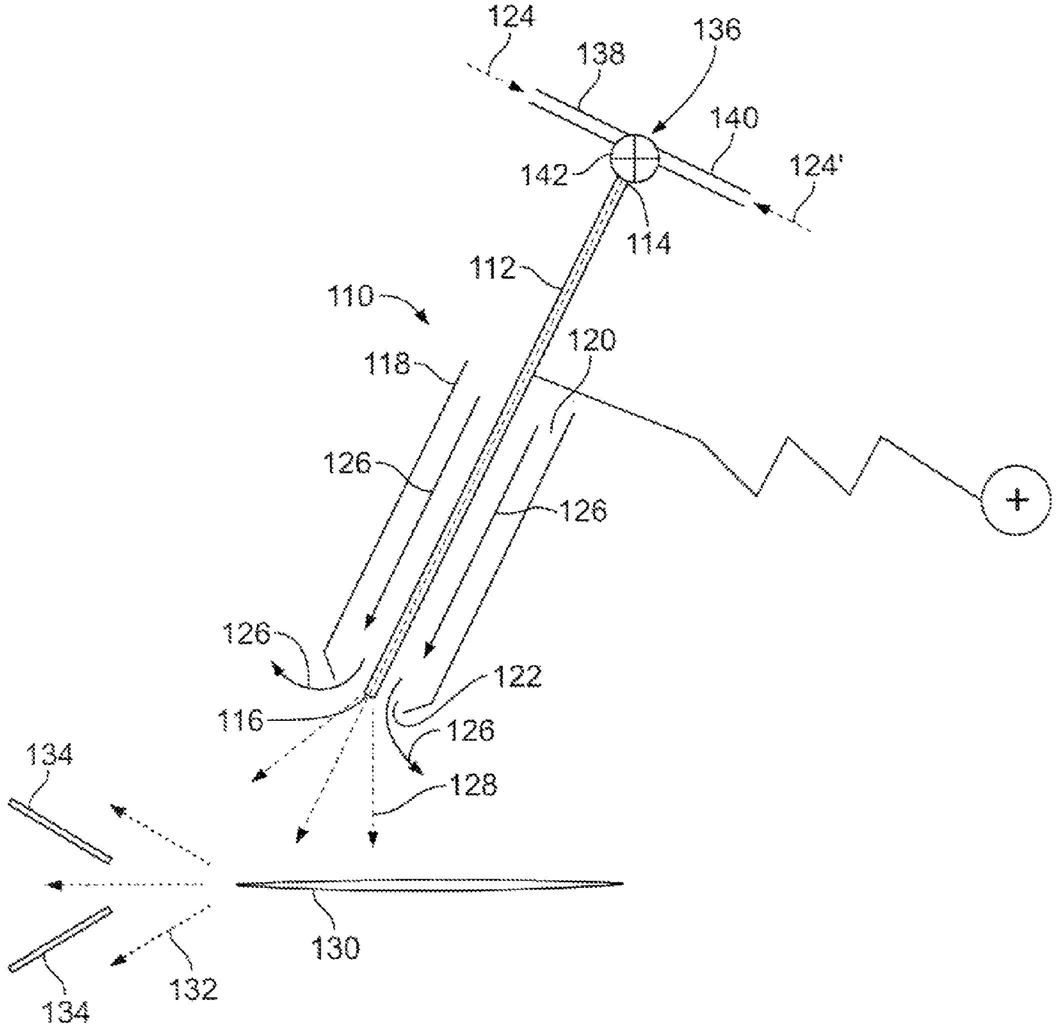
FIG. 13 is a schematic view of a second apparatus suitable for use with another embodiment of the present invention.

Turning first to FIG. 13, an ESI-based apparatus 110 is similar in construction to the apparatus 10 of FIG. 1. Elements of the apparatus 110 that correspond to elements of the apparatus 10 have the same reference numbers as used in FIG. 1, incremented by one hundred. The apparatus 110 has a tee-junction 136 comprising first and second tubular legs 138, 140, which are hydraulically connected to the capillary 112 by a valve 142. The valve 142 can be adjusted to alternately allow a first fluid 124 to enter the first leg 138 or a second fluid 124' to enter the second leg 140, and enter the capillary 112 through the valve 142. In another embodiment, the valve 142 can also be adjusted to allow a combined flow of the first and second fluids 124, 124' into the capillary 112. In such an embodiment, the valve 142 may be adjusted to continuously vary the composition of the flow from 100 percent first fluid 124 to 100 percent second fluid 124'. In some embodiments, the position of the valve 142 may be adjusted automatically using a solenoid (not shown). In the non-limiting examples discussed herein with respect to FIGS. 14-22, the first fluid is a DICE reagent and the second fluid is a DESI-like reagent.

In the examples discussed with respect to FIGS. 14-22, a DICE reagent (toluene) was infused into the metal capillary 112 of an apparatus of the same type as apparatus 110 of FIG. 13 at a flow rate in the range of about 50 μL/min to about 100 μL/min. The DESI reagent was infused into the metal capillary 112 as a solution of 0.1% formic acid in 70% water/30% methanol at a flow rate in the range of about 10 μL/min to about 15 μL/min. In all experiments, the metal capillary 112, which had a nominal inner diameter of 100 μm, was held at a voltage of 5.0 kV. Nitrogen was used as the nebulizing gas, with a set flow rate of 75 L/hr and a set temperature of 350° C. All of the experiments to which FIGS. 14-22 are related were conducted using a Waters Quattro Micro triple quadrupole mass spectrometer (Milford, Mass., USA), with the cone voltage set at 25 V and the cone gas applied at 25 L/hr. The source temperature was kept at 125° C. Analytes were deposited in solution on the target surface, which was braided steel wire, over an area of about 44 $mm^2$ and air-dried. Incident and collection angles in the ion source region were each set at approximately 80°.

Figure 14:
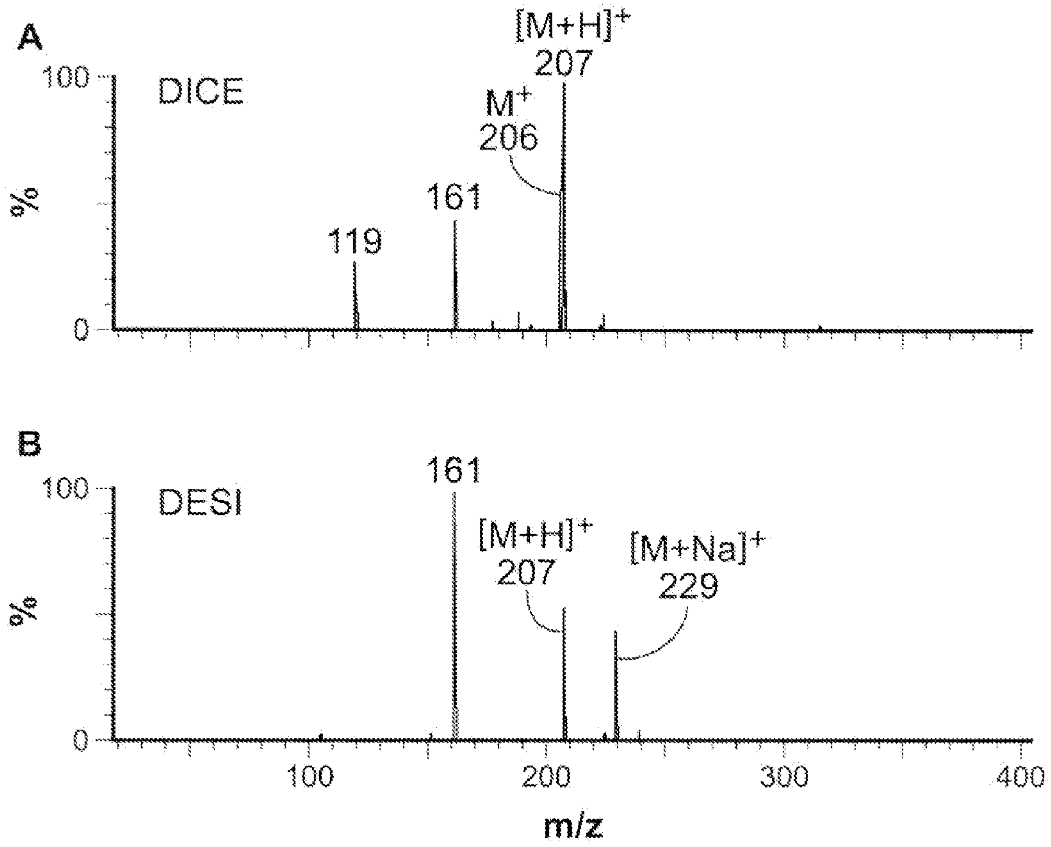
FIG. 14 shows a mass spectrum A of compounds detected by direct analysis of a commercial pain-relief tablet using a DICE technique according to an embodiment of the present invention, and a mass spectrum B of compounds detected by direct analysis of the same tablet using a comparable DESI-like technique.

Turning to the results, FIG. 14 shows mass spectra A and B of compounds detected by direct analysis of a commercial pain-relief tablet (Advil®, Pfizer, Inc., Richmond, Va., USA) using a DICE technique according to an embodiment of the present invention (mass spectrum A) and a comparable DESI-like technique (mass spectrum B). This commercial preparation contains ibuprofen. The tablet was cut open and the DICE-reagent spray directly applied to the exposed material without further sample preparation. Mass spectrum A of FIG. 14 shows that use of a DICE-reagent spray results in peaks at m/z 206 and 207 for the molecular ion $M^{+*}$ (m/z 206) and protonated molecule $[M+H]^+$ of ibuprofen, respectively. In contrast, the mass spectrum B obtained under DESI-like conditions shows peaks at m/z 207 and 229 for protonated $[M+H]^+$ and sodiated $[M+Na]^+$ ibuprofen, respectively.

Figure 15:
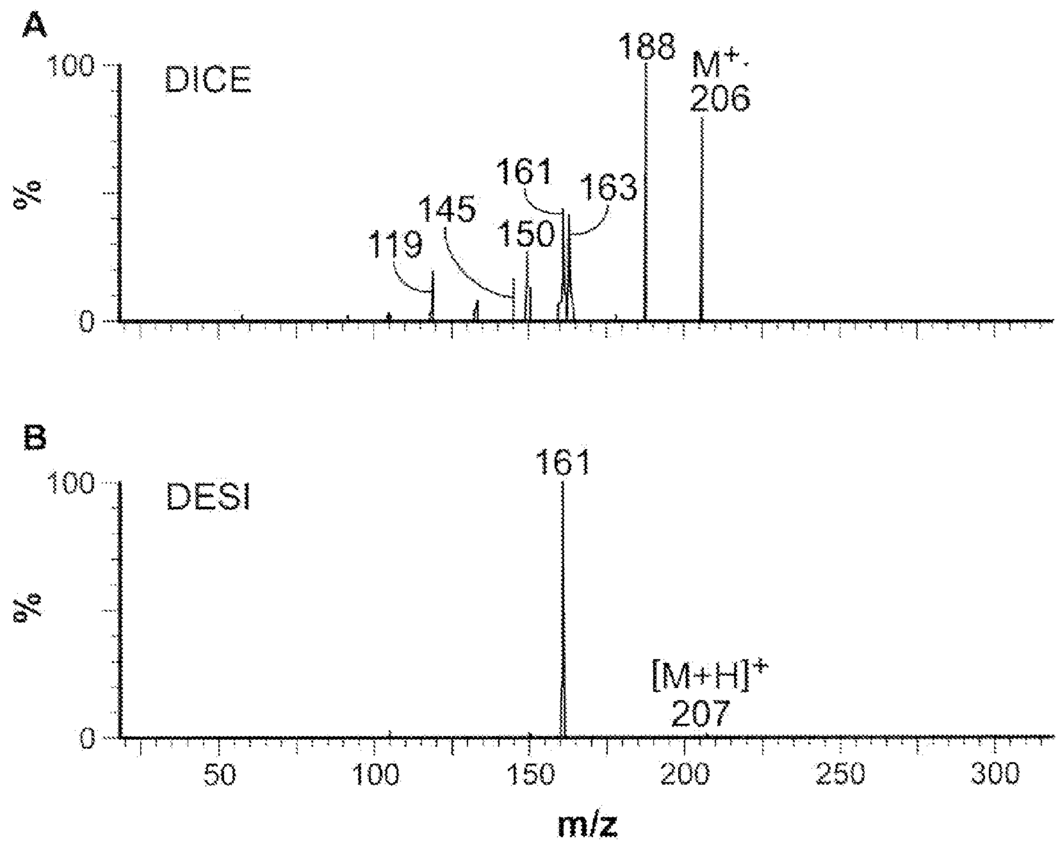
FIG. 15 shows a MS/MS spectrum A of ibuprofen, generated using a DICE technique according to an embodiment of the present invention, and a MS/MS spectrum B of ibuprofen, generated using a comparable DESI-like technique.

FIG. 15 shows MS/MS spectra A and B of ibuprofen generated using a DICE technique according to an embodiment of the present invention (MS/MS spectrum A) and a comparable DESI-like technique (MS/MS spectrum B). Referring to mass spectrum A, it appears that the ibuprofen molecule has been fragmented by collision-induced dissociation (CID) after applying the DICE-reagent spray, producing peaks at m/z 119, 145, 150, 161, 163 and 188, as well as the molecular ion $M^{+*}$ peak at m/z 206. Such fragmentation provides more structural information for identifying the parent molecule. Although not exactly identical, the product ion spectrum of FIG. 14, which was generated using the DICE technique, is similar to the standard electron-ionization (EI) spectrum of ibuprofen (not shown), which is available in the EI spectral library maintained by the National Institute of Standards and Technology (NIST), U.S. Department of Commerce. In contrast, the DESI-like technique generated a MS/MS spectrum B having a large peak for an ibuprofen fragment at m/z 161 and a small peak at m/z for the protonated molecule $[M+H]^+$ at m/z 207, which is evidence of a different pattern of fragmentation.

Figure 16:
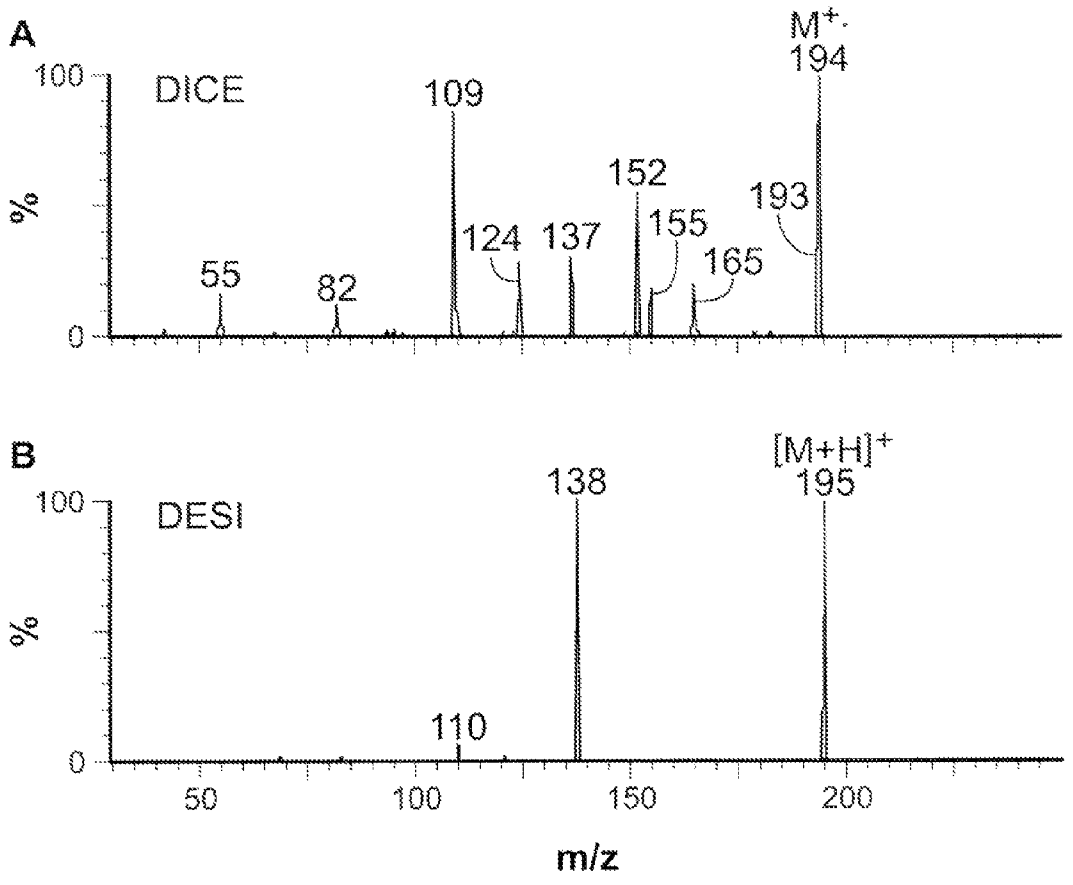
FIG. 16 shows a MS/MS spectrum A of caffeine, generated using a DICE technique according to an embodiment of the present invention, and a MS/MS spectrum B of caffeine, detected using a comparable DESI-like technique.
Figure 17:
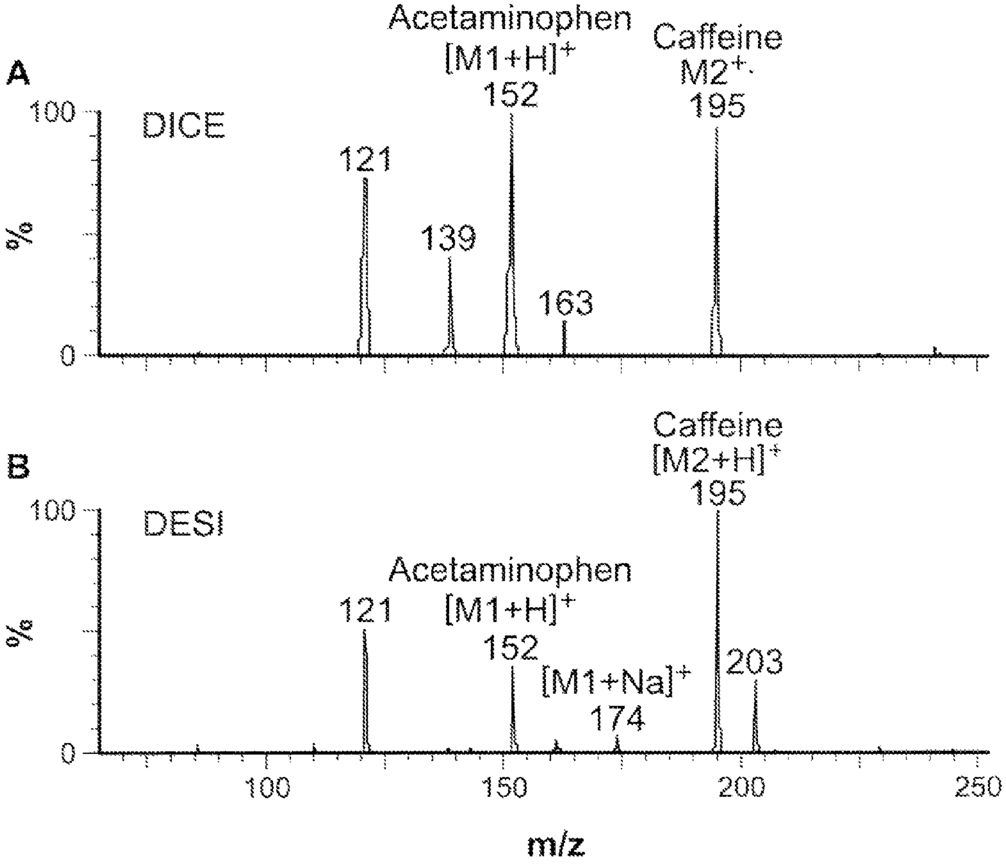
FIG. 17 shows a mass spectrum A of compounds detected by direct analysis of a second commercial pain-relief tablet using a DICE technique according to an embodiment of the present invention, and a mass spectrum B of compounds detected by direct analysis of the same tablet using a comparable DESI-like technique.
Figure 18:
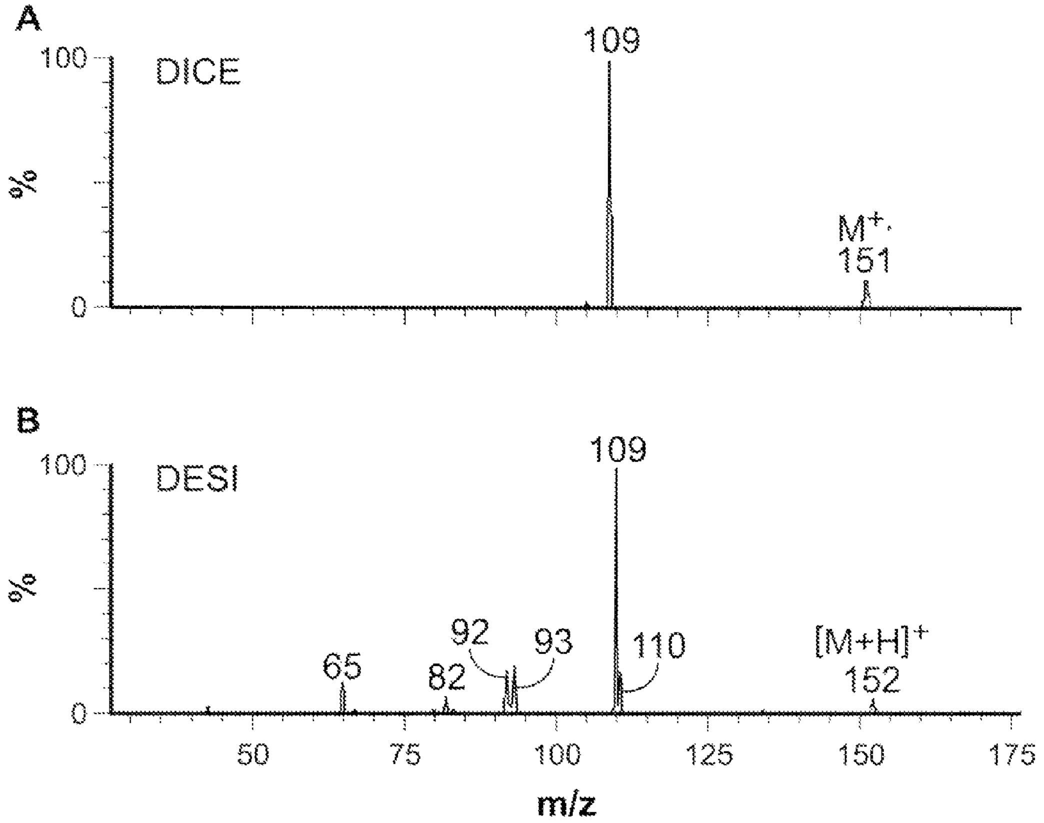
FIG. 18 shows a MS/MS spectrum A of acetaminophen detected using a DICE technique according to an embodiment of the present invention, and a MS/MS spectrum B of acetominophen detected using a comparable DESI-like technique.

FIGS. 16, 17 and 18 show mass spectra related to an analysis of a tablet of a second commercial pain-relief tablet (Equate®, Wal-Mart, Westbury, N.Y., USA). The tablet contains acetominophen and caffeine, among other ingredients. Separate spectra were generated using a DICE technique according to an embodiment of the present invention and a comparable DESI-like technique. The respective DICE-reagent and DESI-like sprays were directly applied to the tablet without sample preparation.

FIG. 16 shows MS/MS spectra A and B of caffeine. The MS/MS spectrum A, generated using a DICE technique according to an embodiment of the present invention, shows numerous peaks, including a peak for the molecular ion $M^{+*}$ at m/z 194. In contrast, the MS/MS spectrum B, generated using the DESI-like technique, shows fewer peaks, including a peak at m/z 195 attributable to the protonated molecular ion $[M+H]^+$. The MS/MS spectrum A more similar to the EI spectrum for caffeine (not shown) in the EI spectral library, than is the MS/MS spectrum B.

FIG. 17 shows MS spectra A and B of compounds detected by direct analysis of the aforesaid Equate® tablet using DICE and DESI-like techniques, respectively. Peaks attributable to acetominophen M1 and caffeine M2 can be seen in both spectra, but the spectra are distinctly different from each other. It may also be seen that the mass spectrum B generated using the DESI-like technique includes a distinct peak at m/z 174, attributable to sodiated acetominophen $[M1+Na]^+$. Artifacts of such sodium adducts are not evident in the mass spectrum B generated using the DICE method.

FIG. 18 shows MS/MS spectra A and B of acetaminophen generated using DICE and DESI-like techniques, respectively. Both mass spectra show a dominant peak at m/z 109, with the mass spectrum B showing a greater number of subsidiary peaks. The spectra show only small peaks attributable to the molecular ion $M^{+*}$ (m/z 151 in mass spectrum A) and the protonated molecule $[M+H]^+$ (m/z 152 in mass spectrum B). The standard EI spectrum for acetaminophen (not shown) shows a single dominant peak at m/z 109. However, since EI is a more energetic process than DICE, a number of smaller peaks would be seen as well.

Figure 19:
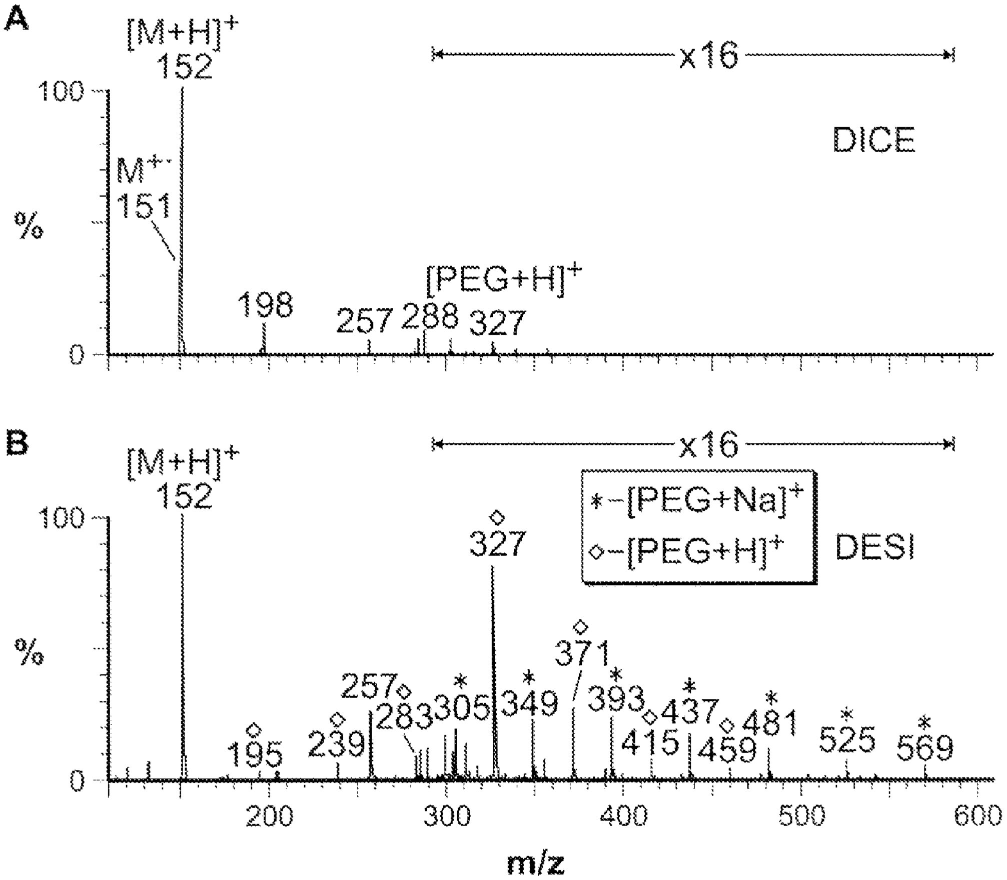
FIG. 19 shows a mass spectrum A of compounds detected by direct analysis of a third commercial pain-relief tablet by a DICE technique according to an embodiment of the present invention, and a mass spectrum B of compounds detected by direct analysis of the same tablet using a comparable DESI-like technique.

Another advantage of DICE techniques is their ability to reduce interferences from undesired background ions. FIG. 19 shows mass spectra A and B of compounds detected by direct analysis of a third commercial pain-relief tablet of unknown make, but branded as Assured, which contains acetaminophen and polyethylene glycol (PEG) as an excipient. The respective DICE-reagent and DESI-like sprays were directly applied to the tablet without sample preparation. Both the mass spectrum A, related to the DICE-reagent spray, and the mass spectrum B, related to the DESI-like spray, show dominant peaks for protonated acetominophen $[M+H]^+$ (m/z 152). However, the mass spectrum B shows numerous peaks attributable to protonated and sodiated PEG fragments $[PEG+H]^+$ and $[PEG+Na]^+$ which interfere with detection of other peaks that may be of interest. The mass spectrum B generated using the DICE-reagent spray shows few peaks attributable to protonated PEG fragments and none which are attributable to sodiated PEG fragments.

Figure 20:
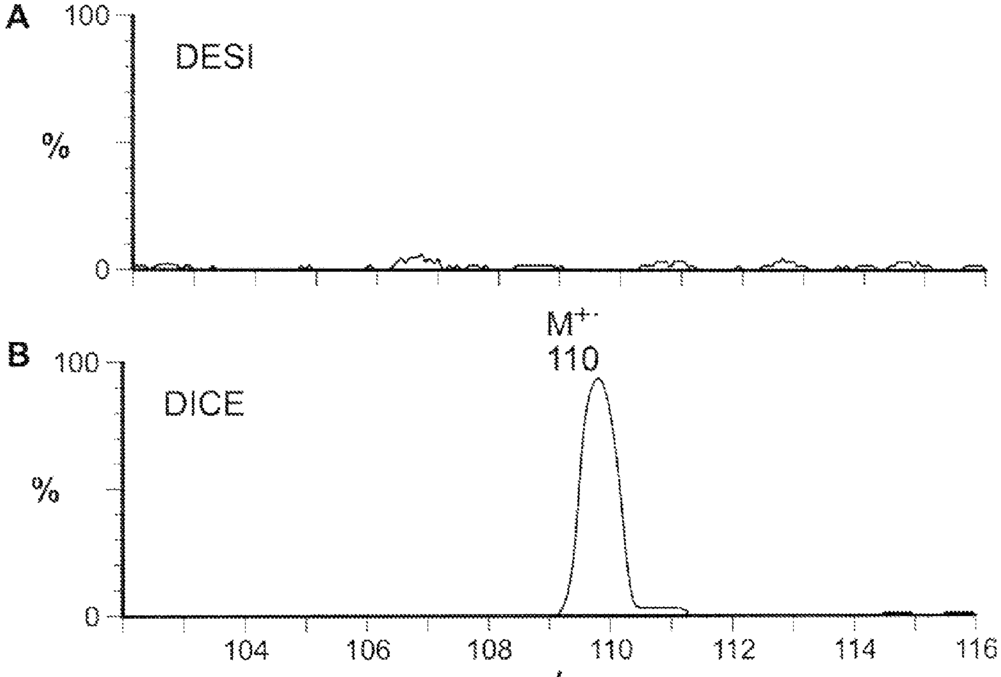
FIG. 20 shows a mass spectrum A of a hydroquinone sample, generated by a DESI technique and a mass spectrum B of a hydroquinone sample, generated by a comparable DICE technique according to an embodiment of the present invention.
Figure 21:
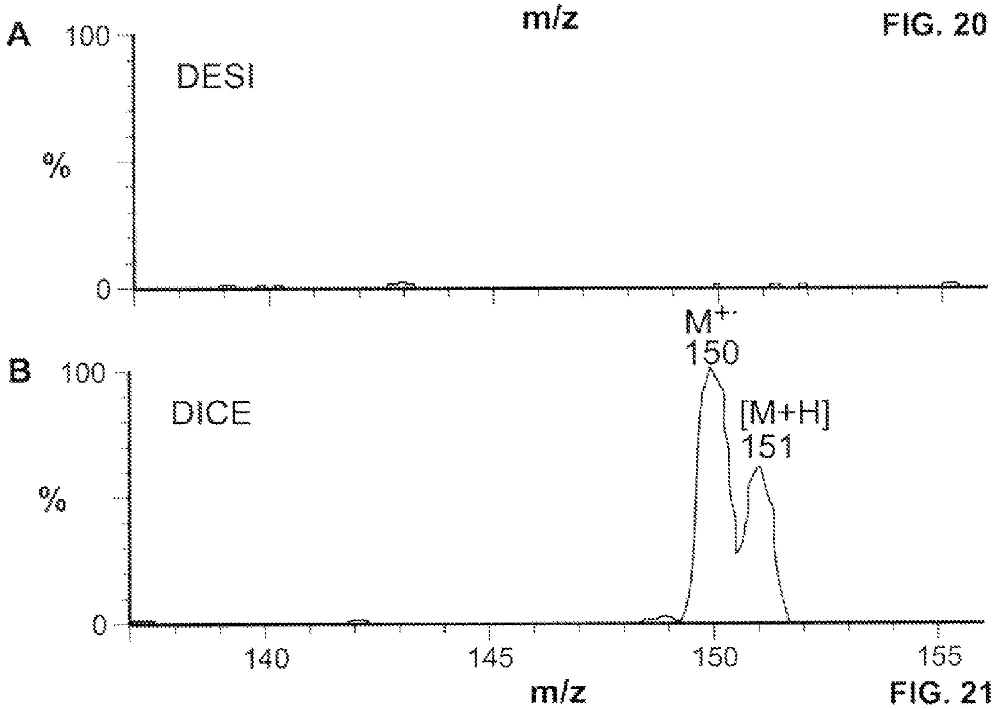
FIG. 21 shows a mass spectrum A of a thymol sample, generated by a DESI technique and a mass spectrum B of a thymol sample, generated by a comparable DICE technique according to an embodiment of the present invention.
Figure 22:
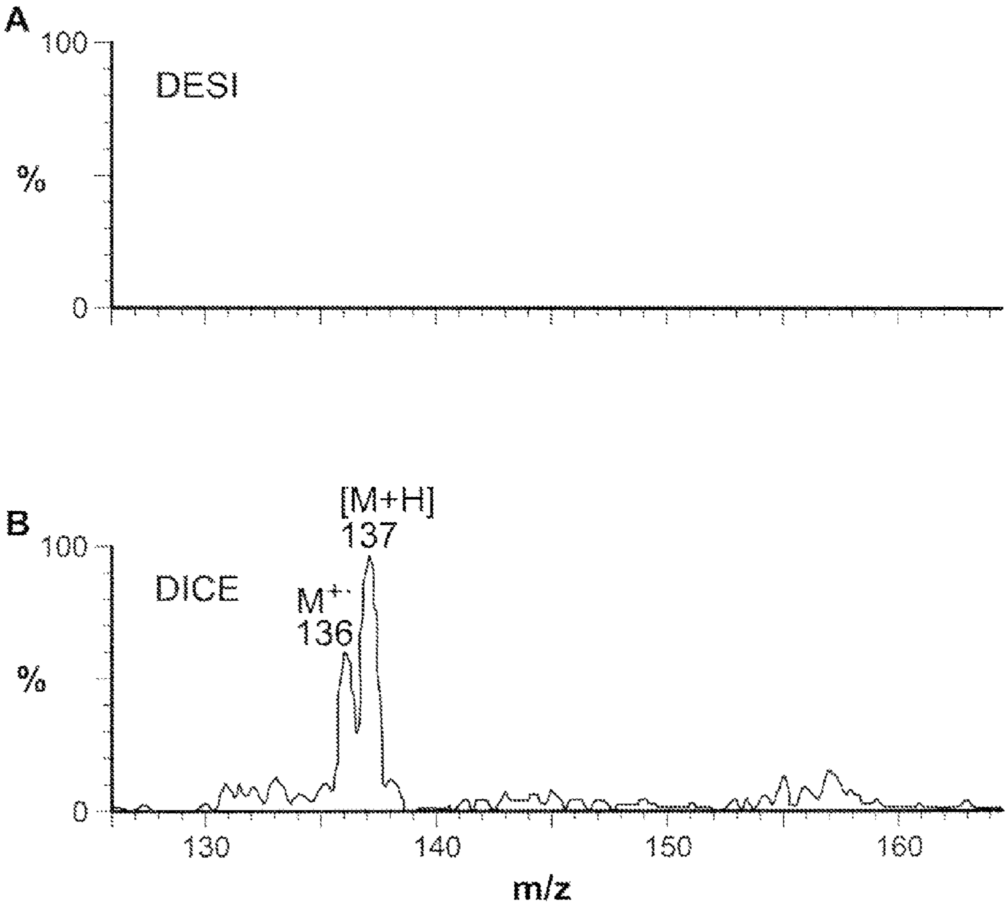
FIG. 22 shows a mass spectrum A of a limonene sample, generated by a DESI technique and a mass spectrum B of a limonene sample, generated by comparable DICE technique according to an embodiment of the present invention.

One of the characteristics of the DESI-reagent spray is that it usually produces little or no ionization of neutral and non-polar compounds. FIGS. 20, 21 and 22 show comparative mass spectra of 1-4-hydroquinone, thymol and limonene, respectively, as generated using a DESI-reagent spray and a DICE-reagent spray according to an embodiment of the present invention.

In FIG. 20, mass spectrum A, generated using the DESI-reagent spray, shows no peak representative of 1-4-hydroquinone. Mass spectrum B, generated using the DICE-reagent spray, shows a strong peak at m/z 110 for the molecular ion $M^{+*}$ of 1-4-hydroquinone.

In FIG. 21, mass spectrum A, generated using the DESI-reagent spray, shows no peak representative of thymol. Mass spectrum B, generated using the DICE-reagent spray, shows strong peaks at m/z 150 and 151 for the molecular ion $M^{+*}$ and protonated molecular ion $[M+H]^+$ of thymol, respectively.

In FIG. 22, mass spectrum A, generated using the DESI-reagent spray, shows no peak representative of limonene. Mass spectrum B, generated using the DICE-reagent spray, shows strong peaks at m/z 136 and 137 for the molecular ion $M^{+*}$ and protonated molecular ion $[M+H]^+$ of limonene, respectively.

Characterization of Analytes Using Combinations of DICE and DESI Reagents

Figure 23:
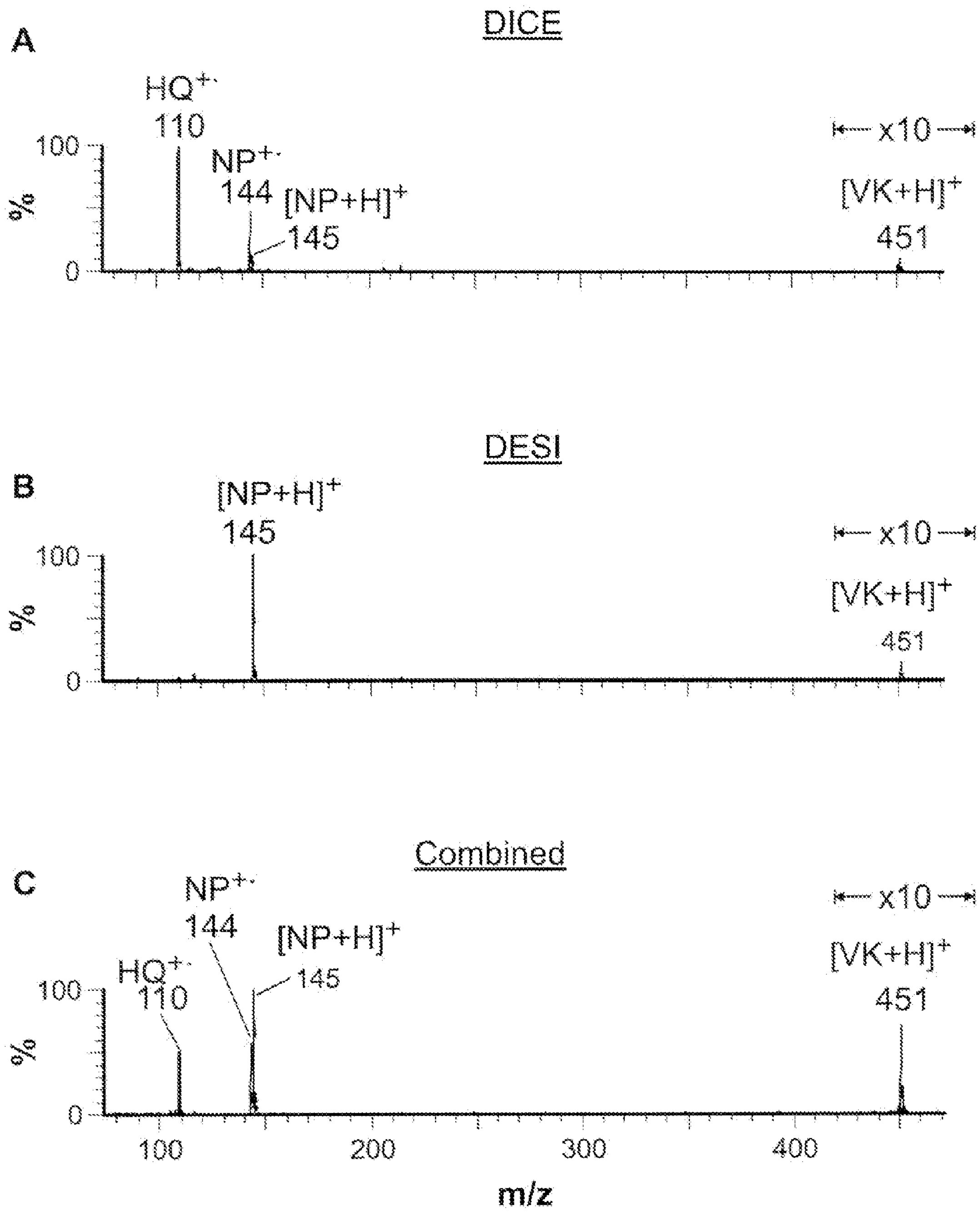
FIG. 23 shows a mass spectrum A of a sample of a mixture containing three compounds, generated by a DICE technique according to an embodiment of the present invention, a mass spectrum B of the same mixture, generated by a comparable DESI technique, and a mass spectrum C of the same mixture, generated by a combined DICE-DESI technique according to another embodiment of the present invention.
Figure 24:
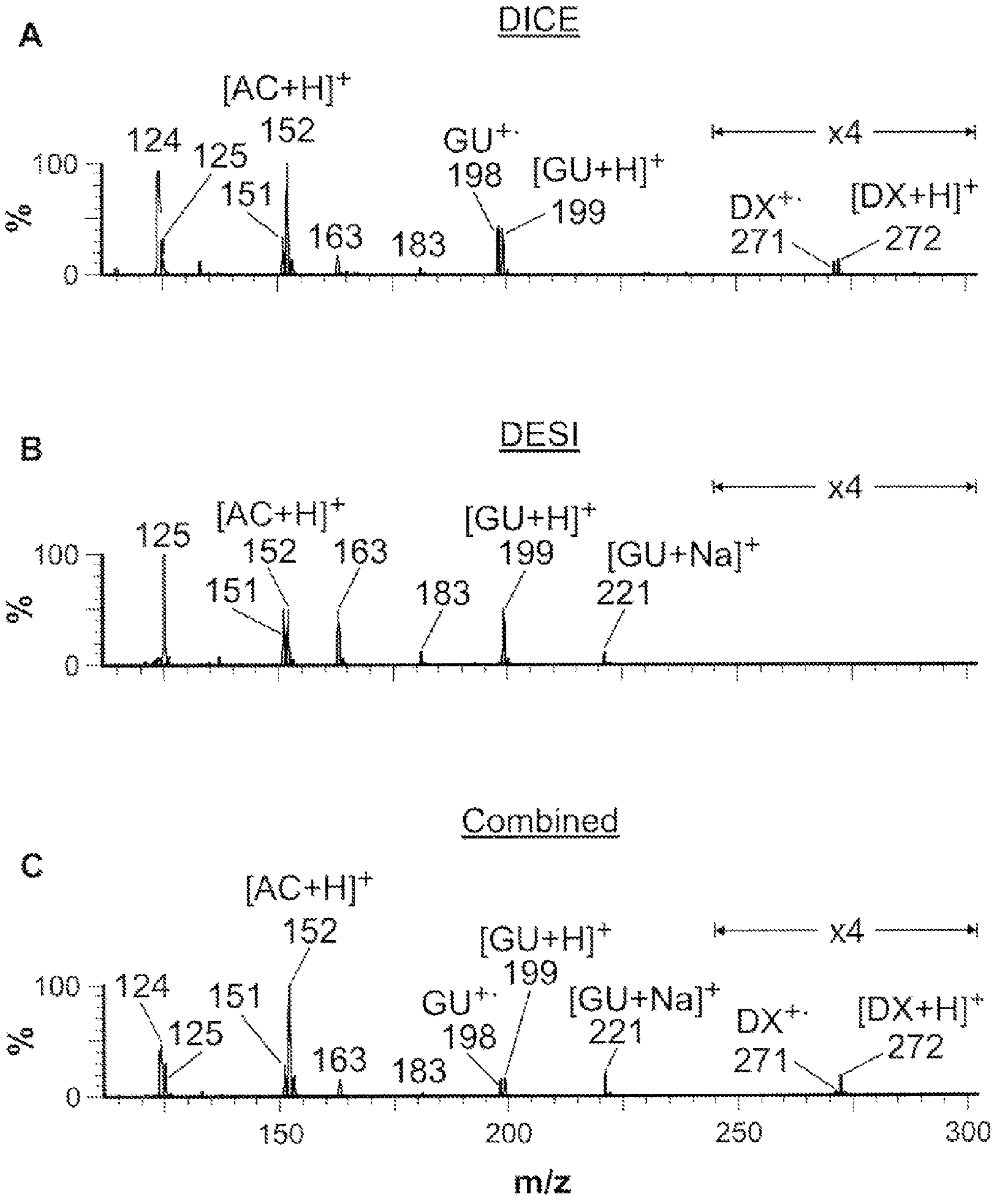
FIG. 24 shows a mass spectrum A of compounds detected by direct analysis of a commercial cold relief tablet using a DICE technique according to an embodiment of the present invention, a mass spectrum B of compounds detected by direct analysis of the same commercial cold relief table using a comparable DESI technique, and a mass spectrum C of compounds detected by direct analysis of the same commercial cold relief tablet using a combined DICE-DESI technique according to another embodiment of the present invention.
Figure 25:
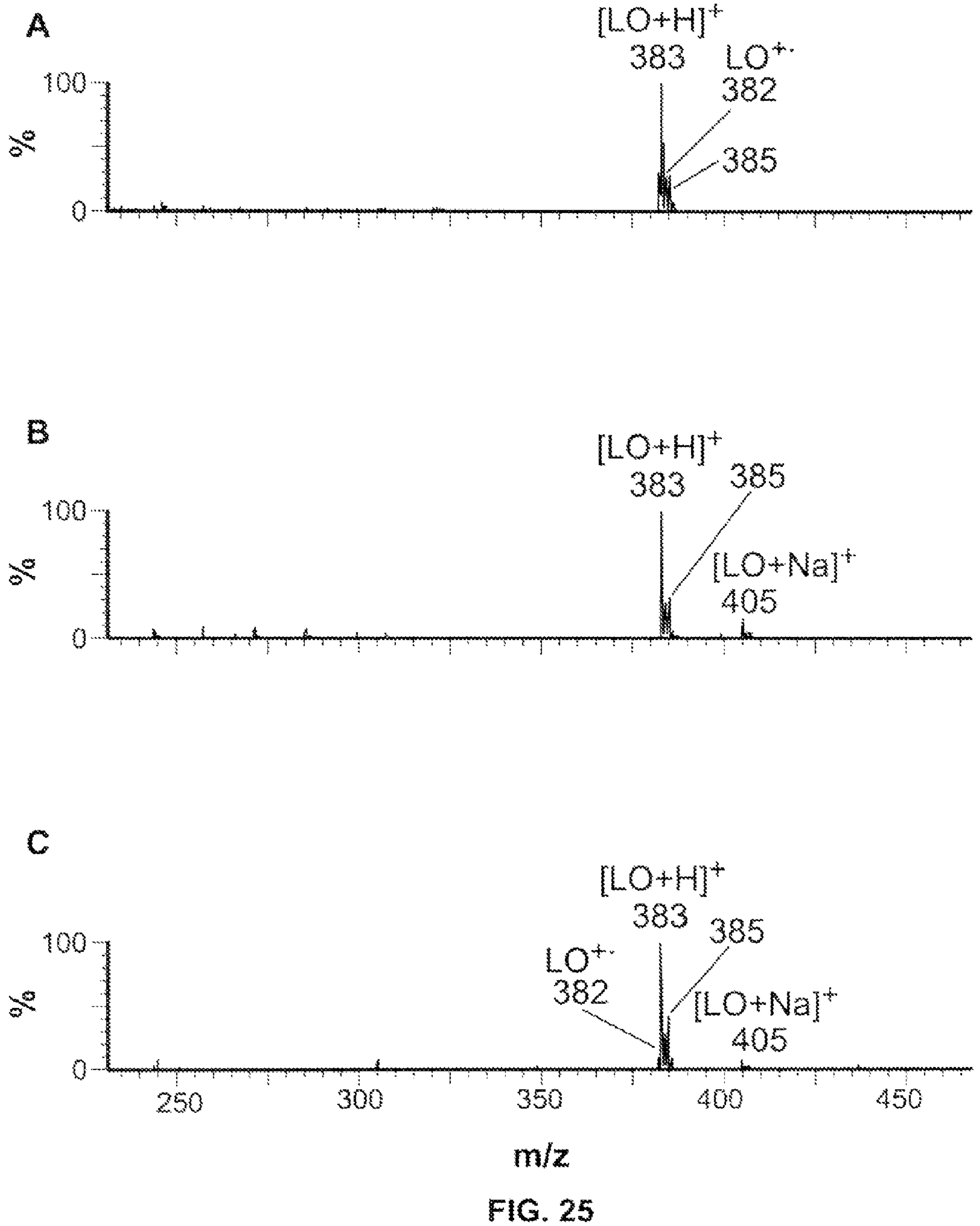
FIG. 25 shows a mass spectrum A of compounds detected by direct analysis of a commercial allergy relief tablet using a DICE technique according to an embodiment of the present invention, a mass spectrum B of compounds detected by direct analysis of the same commercial allergy relief tablet using a comparable DESI technique, and a mass spectrum C of compounds detected by direct analysis of the same commercial allergy relief tablet using a combined DICE-DESI technique according to another embodiment of the present invention.
Figure 26:
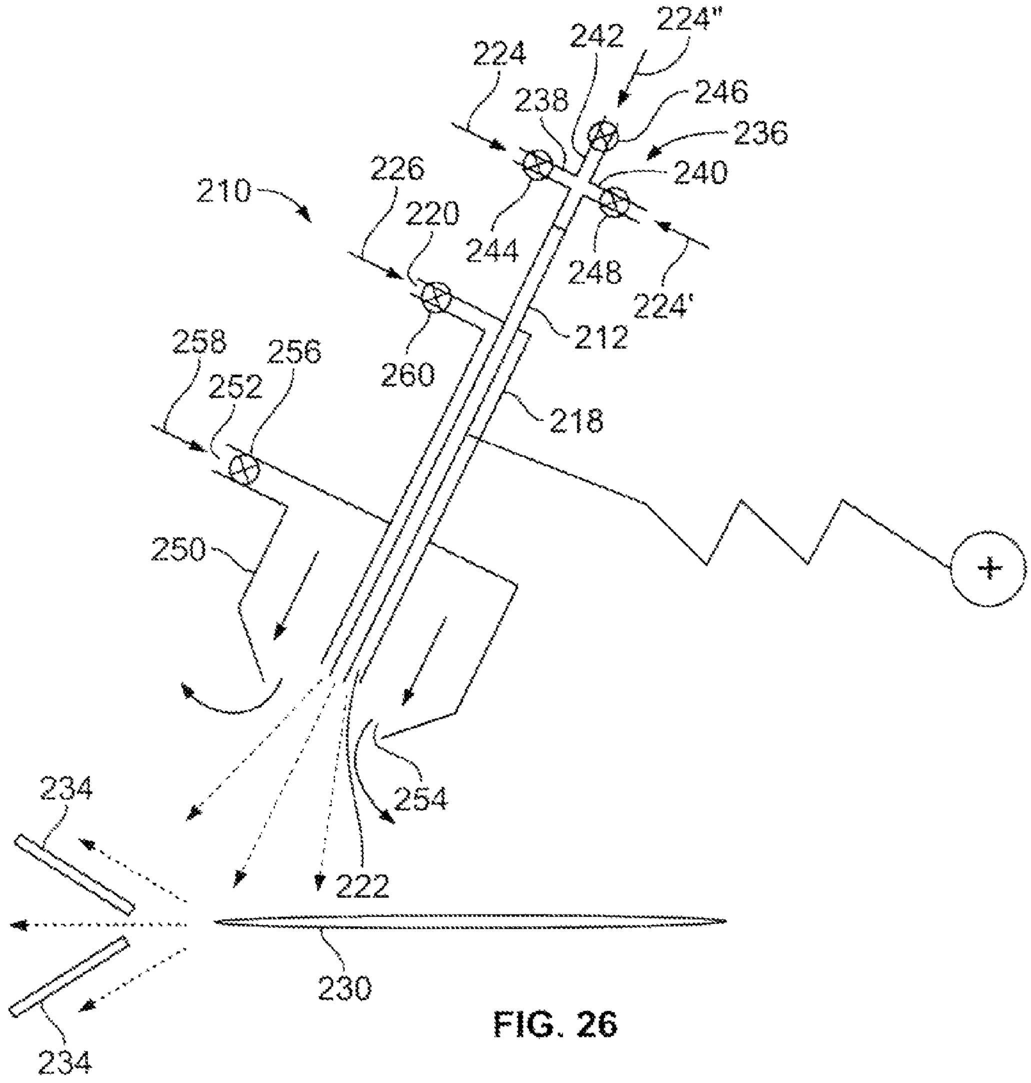
FIG. 26 is a schematic view of a third apparatus suitable for use with another embodiment of the present invention.
Figure 27:
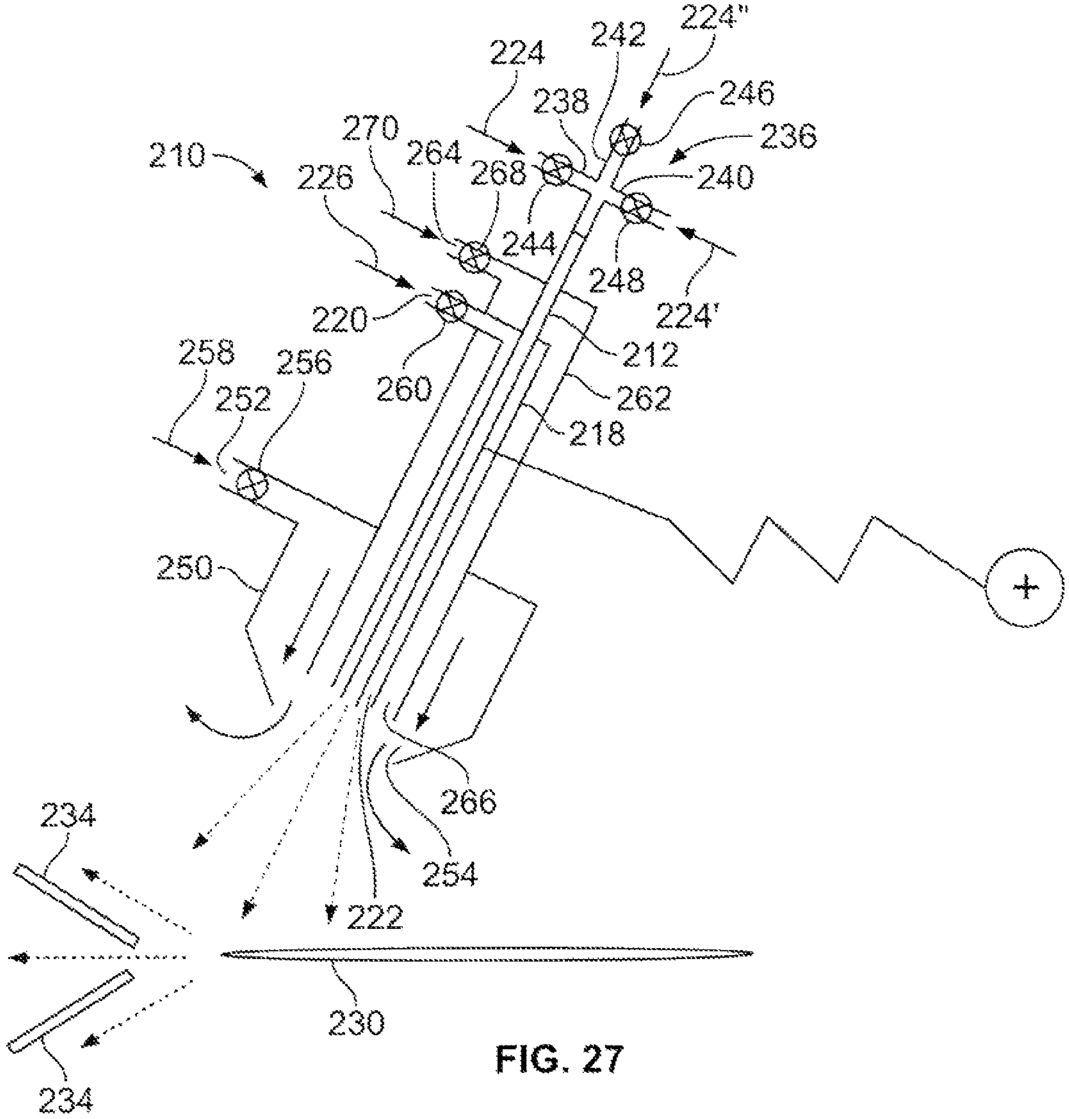
FIG. 27 is a schematic view of the apparatus of FIG. 26 with a modification suitable for use with another embodiment of the present invention.

Another aspect of the DICE technique is that it can be combined with a DESI-like method to expand the range of compounds that can be detected, as discussed with regard to FIGS. 23-25. In the following non-limiting examples, a DICE reagent (toluene) was infused into the metal capillary 112 of an apparatus of the same type as apparatus 110 of FIG. 13, at a flow rate between 50 and 100 μL/min. The DESI reagent was infused into the metal capillary 112 as a solution of 0.1% formic acid in 70% water/30% methanol at a flow rate between 10 and 50 μL/min. For the combined DICE/DESI experiments, the two reagents were mixed in a tee-union, such as tee-union 136 of apparatus 110 of FIG. 13, to form a partially-immiscible blend, which was infused into the metal capillary 112. The volumetric ratio of the DICE reagent to the DESI reagent ranged from 75/25 to 90/10. In all experiments, the metal capillary 112, which had a nominal inner diameter of 100 μm, was held at a voltage of 5.0 kV. Nitrogen was used as the nebulizing gas, with a set flow rate of 75 L/hr and a set temperature of 350° C. All of the experiments to which FIGS. 25-27 are related were conducted using a Waters Quattro Micro triple quadrupole mass spectrometer (Milford, Mass., USA), with the cone voltage set at 25 V and the cone gas applied at 25 L/hr. The source temperature was kept at 125° C. Analytes were deposited in solution on the target surface, which was braided steel wire, over an area of about 44 $mm^2$ and air-dried. Incident and collection angles in the ion source region were each set at approximately 80°.

Turning to the experimental results, FIG. 23 shows mass spectra of a mixture containing 1,4-hydroquinone ("HQ"), β-naphthol ("NP") and vitamin K ("VK"), generated using the DICE-reagent spray (mass spectrum A); the DESI-reagent spray (mass spectrum B) and the combination DESI-DICE-reagent spray (mass spectrum C). The MS spectra shown in FIG. 23 illustrate that hydroquinone, which was not detected using the DESI-reagent spray, was detected as a molecular ion $HQ^{+*}$ (m/z 110) using the DICE-reagent spray and the combined DICE-DESI-reagent spray. These results indicate that a technique using a combined DICE-DESI-reagent spray is more versatile in detecting compounds in mixtures than using either the DICE-reagent spray or the DESI-reagent spray alone. Further, comparing the three MS spectra A, B and C reveals that both the naphthol molecular ion $NP^+$ (m/z 144) and the protonated naphthol $[NP+H]^+$ (m/z 145) may be generated simultaneously by the combined DICE-DESI reagent spray. This phenomenon would enable near-real time recording of the MS/MS profiles of both the molecular ion and protonated species. It may also be noted that the peak observed for protonated vitamin K $[VK+H]^+$ is more prominent in the mass spectrum C, generated by using the combined DICE-DESI reagent spray.

The versatility of the DICE, DESI and combined DICE-DESI reagents was further demonstrated with regard to analytes in a complex sample matrix. Turning to FIG. 24, showing mass spectra A, B and C, when a tablet of a common cold remedy (i.e., Tylenol®, MCNEIL-PPC, Inc., Fort Washington, Pa., USA) was subjected to a DICE-reagent spray (mass spectrum A), peaks were detected for three of the active ingredients in the tablet (i.e., acetominophen ("AC"), guaifenisen ("GU"), and dextromethorphan ("DX"). As shown in mass spectrum B, use of a DESI-reagent spray resulted in a peak at m/z 221 for the sodium adduct of guaifenisen $[GU+Na]^+$, which was not present in mass spectrum A. Further, mass spectrum B did not exhibit any peak for dextromethorphan. The use of the combined DICE-DESI-reagent spray (mass spectrum C) not only generated the aforementioned sodium adduct of guaifenesin, but also showed a peak at m/z 272 for a protonated ion of dextromethorphan $[DX+H]^+$. Other mass spectrometric peaks for the ions that either were not generated by DICE-reagent spray or the DESI-reagent spray when used alone, were observed when the combined DICE-DESI-reagent spray was used.

Turning to FIG. 25, analyses similar to those of FIGS. 23 and 24 were performed with an allergy relief tablet (i.e., Claritin®, Schering-Plough Health Care Products, Inc., Memphis, Tenn., USA), which has loratidine ("LO") as its principle active ingredient. The mass spectrum A generated using the DICE-reagent spray showed peaks at m/z 382 and 383 for the molecular ion of loratidine $LO^{+*}$ and the proton adduct $[LO+H]^+$, respectively. A peak for the sodium adduct $[LO+Na]^+$, which is not present in mass spectrum A, is seen at m/z 405 in mass spectrum B, generated using the DESI-reagent spray. Mass spectrum C, generated using the combined DICE-DESI reagent spray, shows peaks for all three species (i.e., $LO^{+*}$, $[LO+H]^+$ and $[LO+Na]^+$).

Characterization of Analytes Using Metastable Helium

In another aspect of the present invention, desorption ionization by charge exchange is achieved using metastable helium. For the purpose of the present disclosure, metastable helium comprises neutral energized helium in which one or both electrons have energies greater than their ground states, and may also comprise helium cations (e.g., $He^+$). In various embodiments of the present invention, metastable helium may be introduced into the ionization chamber of a mass spectrometer in a helium stream, in a stream of helium mixed with another gas (e.g., nitrogen), or with a solvent (e.g., toluene).

Turning to FIGS. 26 and 27, an ESI-based apparatus 210 for generating metastable helium is similar in construction to the apparatus 10 of FIG. 1 and the apparatus 110 of FIG. 13, which were discussed in relation to producing DICE-reagent sprays, DESI-reagent sprays, and combined DICE-DESI-reagent sprays. Elements of apparatus 210 that correspond to elements of apparatus 10 have the same reference numbers as used in FIG. 1, incremented by two hundred. Referring to FIG. 26, the junction 236 of apparatus 210 comprises first, second and third tubular legs 238, 240 and 242, which are hydraulically connected to the capillary 212. Flows of first, second and third reagents 224, 224', 224" into the capillary 212 are controlled by flow control valves 244, 246, 248, which are associated with the first, second and third tubular legs 238, 240 and 242, respectively. The flow control valves 244, 246, 248 can be adjusted independently of each other such that any one reagent 224, 224', 224", or mixtures thereof, are infused into the capillary 212. In various embodiments of the present invention, the flow control valves 244, 246, 248 may be adjusted to continuously vary the composition of the flow to any mixture of reagents 224, 224', 224" In some embodiments, the positions of the valves 244, 246, 248 may be adjusted automatically using solenoids (not shown). In the non-limiting examples discussed herein with respect to FIGS. 28-32, the third fluid 224" is helium, although other gases, such as nitrogen, may be used. The first and second fluids 224', 224" may be a DICE reagent and a DESI-like reagent, respectively, as discussed with respect to FIGS. 13-25.

Continuing to refer to FIG. 26, the apparatus 210 further comprises a gas collar 250, having a gas collar inlet 252 and a gas collar outlet 254, that surrounds a nebulizer tube 218 such that an outlet 222 of the nebulizer tube 218 is exposed through the gas collar outlet 254. A flow control valve 256 is inline with the gas collar inlet 252 for controlling the flow of a first assisting gas 258 into the gas collar 250. A flow control valve 260 is also provided inline with a nebulizer inlet 220 for controlling the flow of nebulizer gas 226 into the nebulizer tube 218. The flow control valves 256, 260 may be adjusted to continuously vary the flow rates of the gas 258 or the nebulizer gas 226 from 0 L/min upward. The positions of the flow control valves 256, 260 may be adjusted automatically using solenoids (not shown).

Turning to FIG. 27, the apparatus 210 may also include a seed tube 262 having a seed tube inlet 264 and a seed tube outlet 266, that surrounds the nebulizer tube 218 such that the outlet 222 of the nebulizer tube 218 is exposed through the seed tube outlet 266. In such an embodiment of the apparatus 210, the gas collar 250 surrounds the seed tube 262 such that the seed tube outlet 266 is exposed through the gas collar outlet 254. A flow control valve 268 is also provided inline with the seed tube inlet 264 for controlling the flow of a second assisting gas 270 into the seed tube 262. The flow control valve 268 may be adjusted to continuously vary the flow rate of the second assisting gas 270 from 0 L/min upward. The position of the flow control valve 268 may be adjusted automatically using solenoids (not shown).

In a metastable helium technique according to an embodiment of the present invention, helium 224" is infused into the capillary 212 through the third leg 242 of the junction 236. In a modification of the embodiment, a DICE reagent 224 or a DESI-like reagent 224', or both, may also be infused into the capillary 212 along with the helium 224". In another modification of the embodiment, a non-reactive solvent (i.e., one that does not readily ionize by ESI processes) may be used in place of a DICE reagent or DESI-like reagent. In yet other modifications of the embodiment, a sample solution containing analytes, whether in a DICE reagent, a DESI reagent, a combined DICE-DESI reagent or a non-reactive solvent, may be infused into the capillary 212. The capillary 212 is held at a voltage in the range of about 1 kV to about 5 kV. The helium 224" exiting the capillary outlet contains metastable helium. A chemically-inert gas 226 may be injected into the inlet 220 of the nebulizer tube 218 to nebulize DICE reagent 224 or DESI reagent 224', if either is used in the process. A nebulizer gas 226 is not necessary, and might not be desirable, when helium 224" is used without a DICE reagent 224, a DESI reagent 224' or other solvent. A first assisting gas 258 may be injected into the gas collar inlet 252 and a second assisting gas 270 may be injected into the seed tube inlet 264, in embodiments where the seed tube 262 is present.

In such embodiments of the invention as discussed above, metastable helium is created as an effect of the electrical field voltage maintained at the capillary in a single-stage process at atmospheric pressure. This is in contrast to processes such as APCI, where ionized helium is produced in a corona field under vacuum, or DART, which produces undesirable ions that must be removed in multiple stages.

The assisting gases 258, 270 may be selected to serve such purposes as, for example: drying solvent droplets (e.g., by using a heated gas); assisting in the desorption of analytes having low volatilities (e.g., by using a chemically-inert heated gas); assisting in the nebulization of a DICE-reagent 224 or DESI reagent 224', where such are present; or introducing additional reactive species into the ionization chamber of the mass spectrometer for the study of chemical reactions. It may be noted that assisting gases may be selected to create an environment in the ionization chamber that promotes the formation of the desired ionized species of analyte, as discussed with respect to FIGS. 28-30, hereinbelow. One having ordinary skill in the art will be able, given the present disclosure, to knowledgeably select suitable assisting gases for these and other purposes related to mass spectrometric analysis of samples and the study of chemical reactions.

In embodiments where DICE and/or DESI-like reagents, or other solvents, are used, the resulting spray would be directed at the sample platform, as discussed above with respect to other embodiments of the present invention employing DICE and/or DESI-like reagents. Where helium is used as the reagent in the absence of solvents, the analytes should be present as vapors in the ionization chamber. There are a number of suitable sample platforms for desorbing analytes into the vapor phase. For example, a sample of analyte having a conveniently high vapor pressure can be inserted into a tube, and a gas passed through the tube to carry the analyte vapor into the ionization chamber. Samples containing analytes having low vapor pressures, such as may be found in petroleum and some petroleum products, can be heated to create an analyte vapor. This can be achieved, for example, by placing the sample in a glass capillary having one closed end, placing the capillary into a recess in a metal probe, and heating the probe (and, thus, the capillary and sample) to the desired temperature. In such embodiments, a heated gas may be introduced into the ionization chamber through the gas collar 250 or the seed tube 262 to maintain the vapor pressure of the analyte in the ionization chamber. In another example of a suitable sample platform, liquid samples may be applied to a ring, a braided wire or a mesh, and allowed to dry. A gas would then be passed over the ring to carry the analyte vapor into the ionization chamber. For low-volatility analytes, the ring or wire may be heated to vaporize the analyte, or a heated gas may be applied. In all embodiments, it is desirable that the temperature of the sample platform and/or the environment in the ionization chamber be maintained to generate and sustain an appreciable vapor pressure of the analytes of interest.

Figure 28:
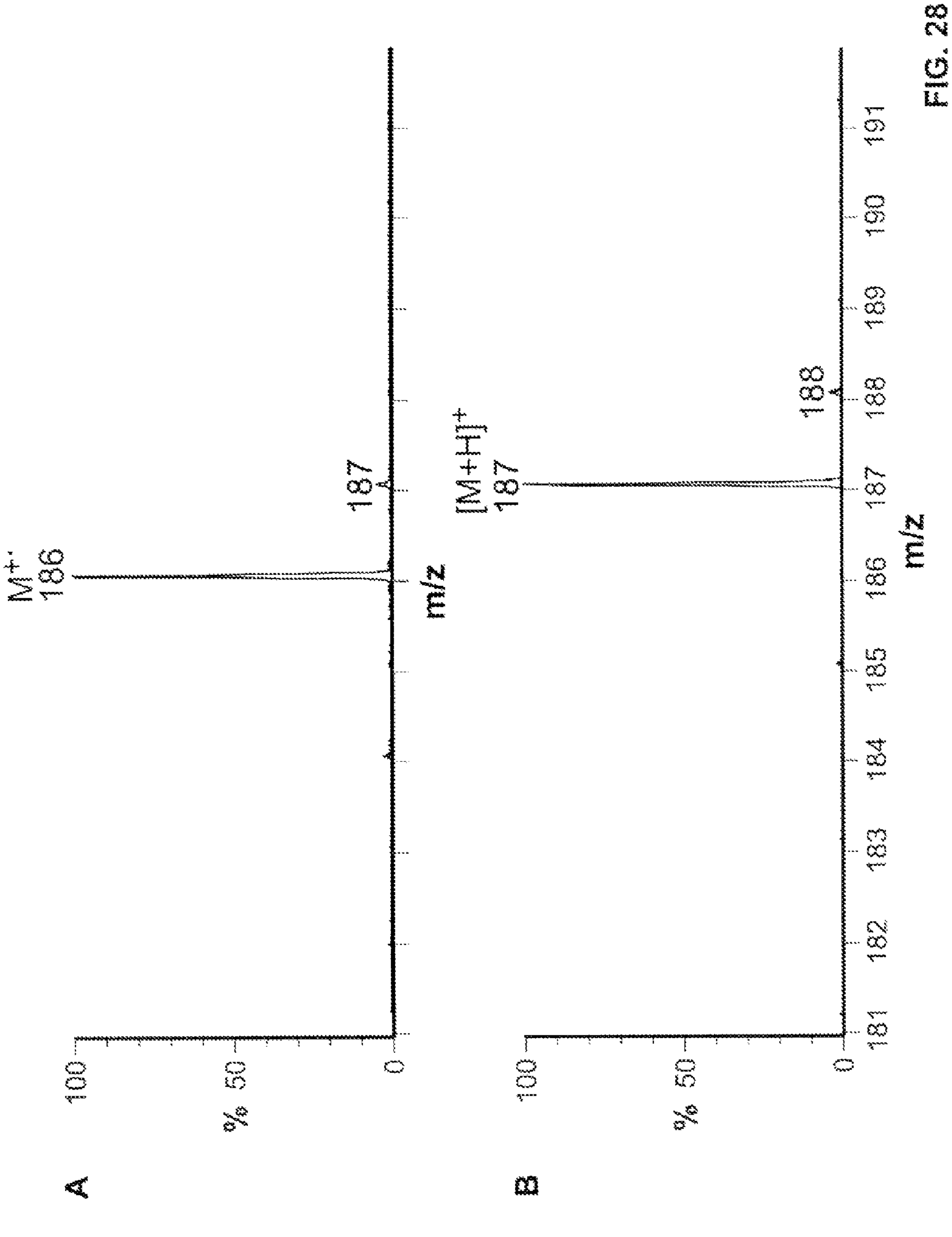
FIG. 28 shows a mass spectrum A of ferrocene, generated with metastable helium according to an embodiment of the present invention, and a mass spectrum B of ferrocene, generated using metastable helium according to another embodiment of the present invention.
Figure 29:
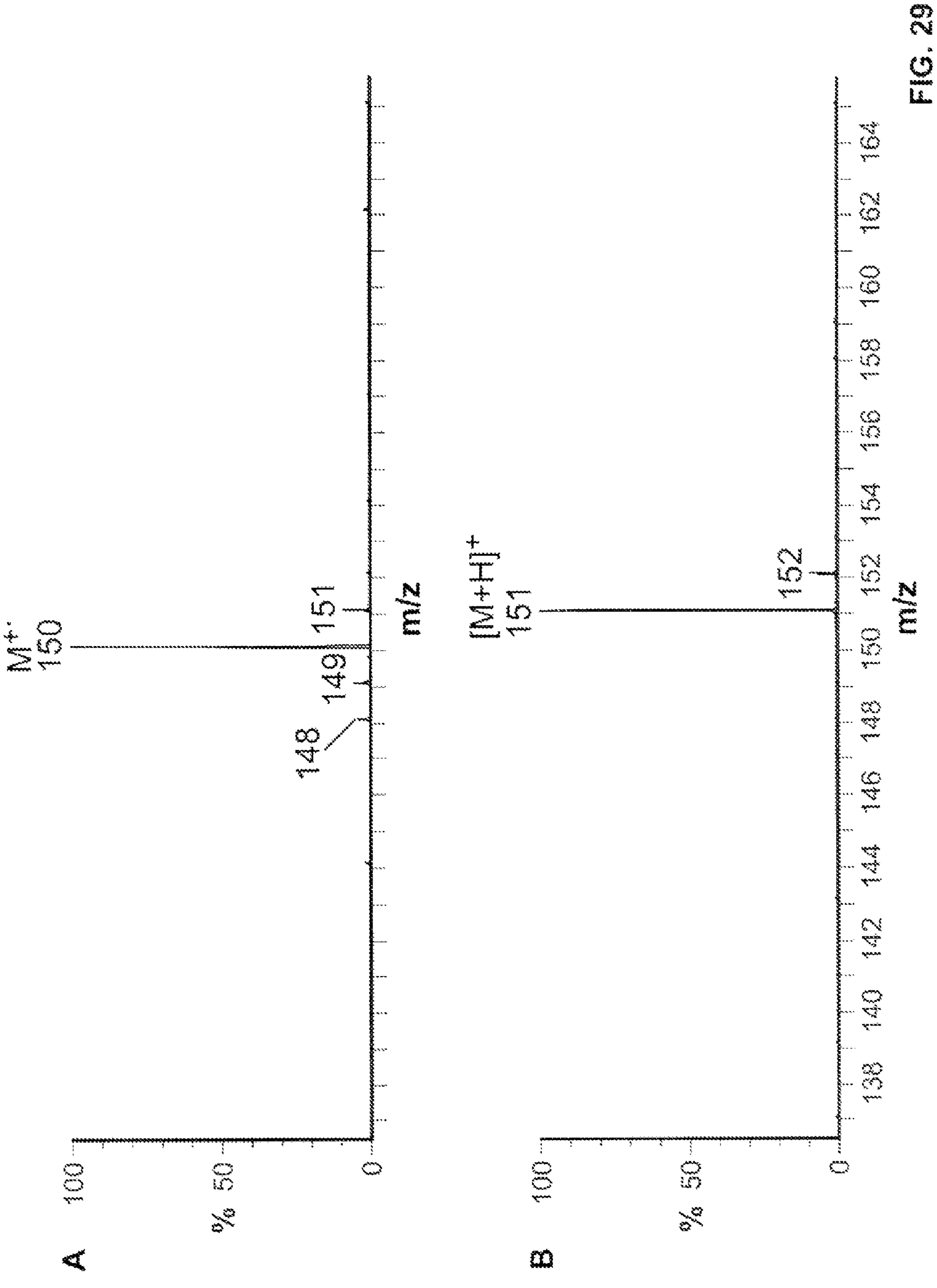
FIG. 29 shows a mass spectrum A of thymol, generated with metastable helium according to an embodiment of the present invention, and a mass spectrum B of thymol, generated using metastable helium according to another embodiment of the present invention.
Figure 30:
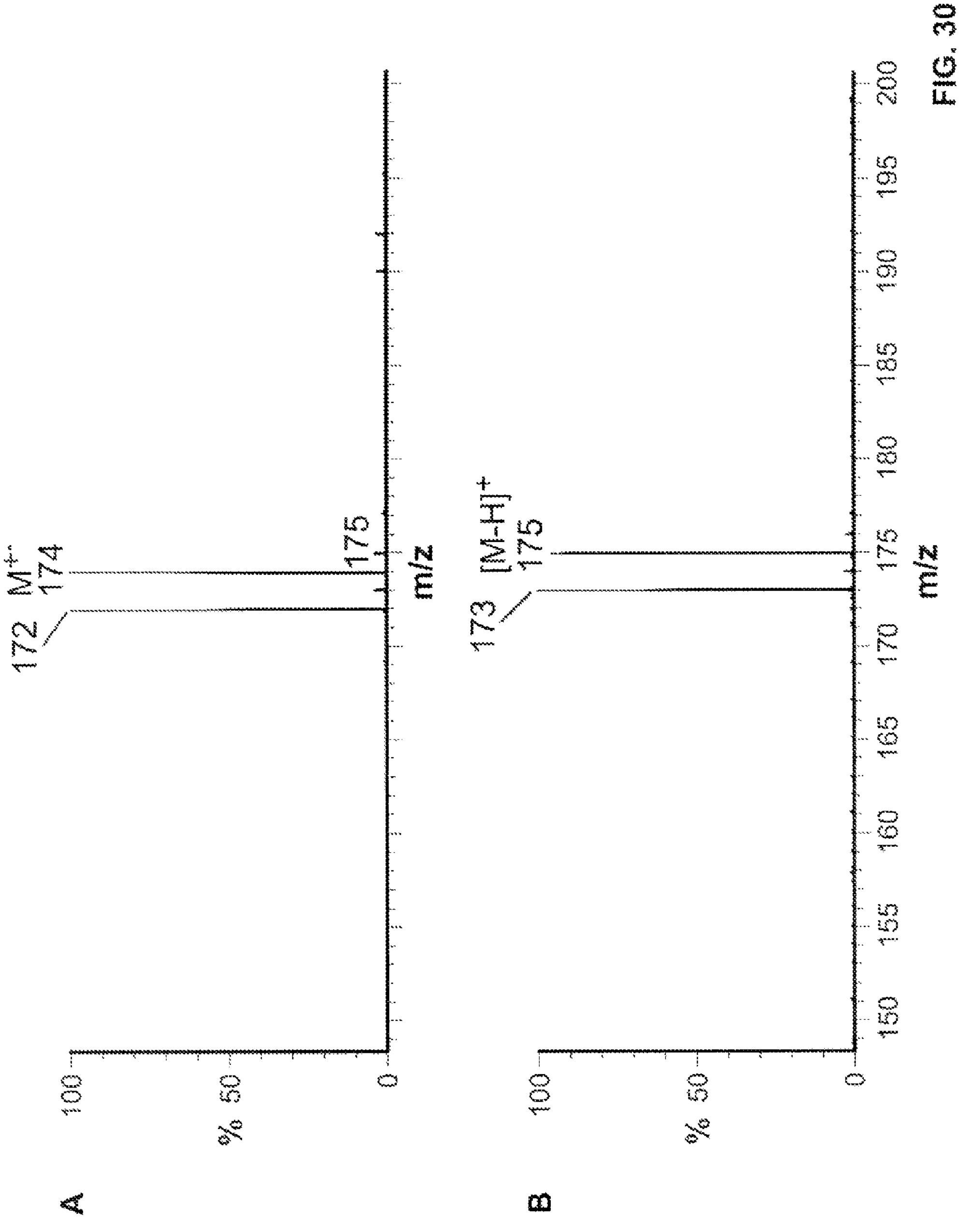
FIG. 30 shows a mass spectrum A of 4-bromophenol, generated with metastable helium according to an embodiment of the present invention, and a mass spectrum B of 4-bromophenol, generated according to another embodiment of the present invention.

Turning now to examples of sample analysis using metastable helium, FIGS. 28-30 show an effect of the environment in the ionization chamber on the ionization of analytes in the vapor phase. In the examples of FIGS. 28-30, helium was used as the sole reagent in an apparatus similar to the apparatus 210 of FIG. 27. No nebulizer gas was introduced. The capillary, similar to capillary 212 of FIGS. 26 and 27, was held at a voltage of 3.5 kV. Assisting gases were added as needed to create the desired environments in the ionization chamber. The effects of two such environments are presented: (A) a nitrogen environment saturated with water; and (B) a dry nitrogen environment at 200° C.

FIG. 28 shows mass spectra A and B generated by injection of metastable helium into a ferrocene vapor. Mass spectrum A shows that the molecular ion of ferrocene $M^{+*}$ (m/z 186) is dominant in an environment of water-saturated nitrogen. Mass spectrum B shows that the protonated molecular ion of ferrocene $[M+H]^+$ (m/z 187) is dominant in an environment of dry nitrogen at 200° C.

FIG. 29 shows mass spectra A and B generated by injection of metastable helium into a thymol vapor. Mass spectrum A shows that the molecular ion of thymol $M^{+*}$ (m/z 150) is dominant in an environment of water-saturated nitrogen. Mass spectrum B shows that the protonated molecular ion of thymol $[M+H]^+$ (m/z 151) is dominant in an environment of dry nitrogen at 200° C.

FIG. 30 shows mass spectra A and B generated by injection of metastable helium into a 4-bromophenol vapor. Mass spectrum A shows that the molecular ions of 4-bromophenol $M^{+*}$ (m/z 172 and 174) are dominant in an environment of water-saturated nitrogen. Mass spectrum B shows that the protonated molecular ions of 4-bromophenol $[M+H]^+$ (m/z 173 and 175) are dominant in an environment of dry nitrogen at 200° C. Two dominant peaks are seen in each of mass spectra A and B because of the presence of the two predominant isotopes of bromine in the sample (i.e., Br-79 and Br-81).

Turning to examples of analysis of low-volatility compounds, mass spectra of the low-volatility paraffinic compounds n-pentacosane and n-tetracontane were generated using metastable helium according to an embodiment of the present invention. Both compounds, especially n-tetracontane, are difficult to detect using conventional mass spectrometric methods known in the prior art.

Figure 31:
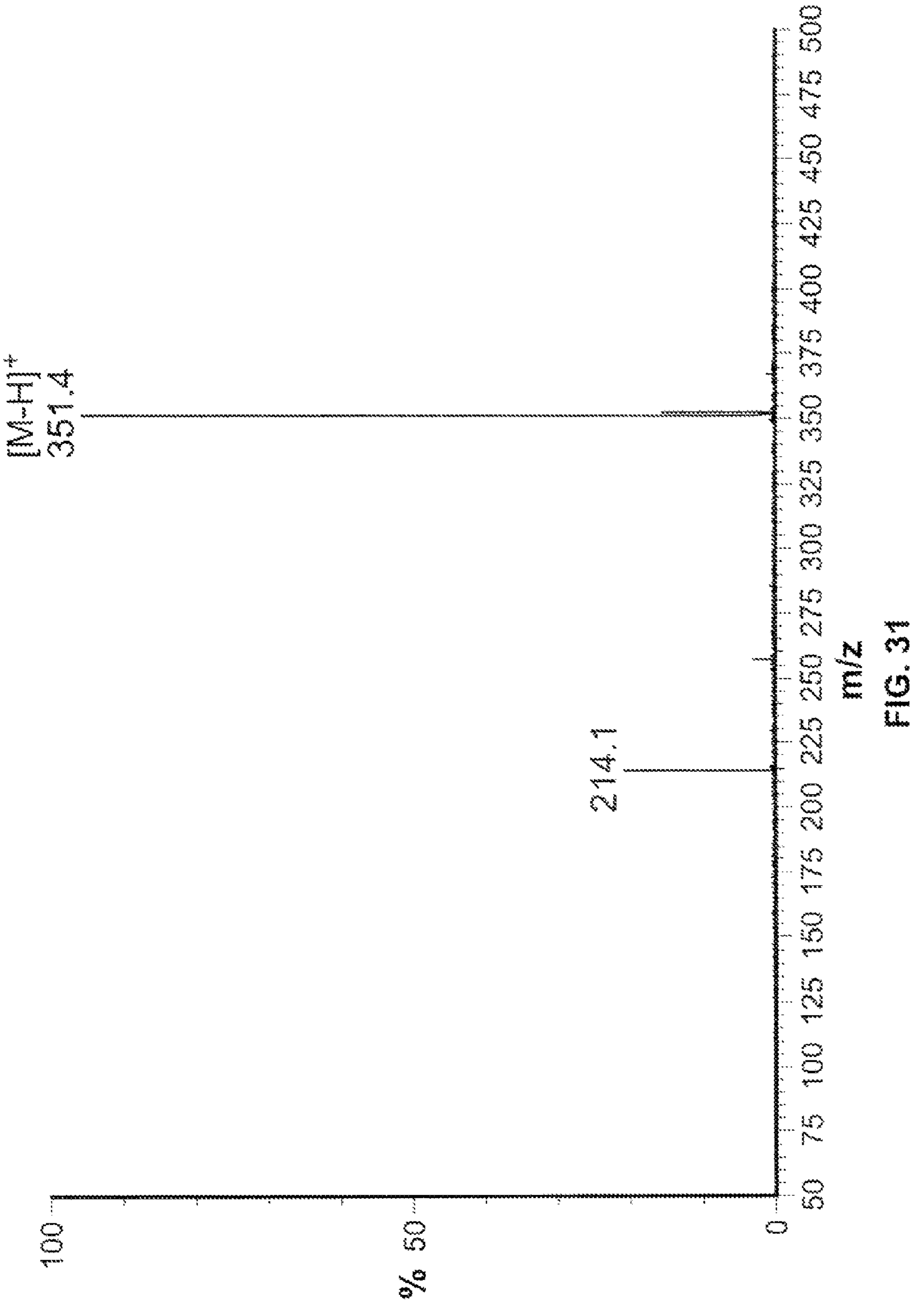
FIG. 31 shows a mass spectrum of n-pentacosane, generated with metastable helium according to an embodiment of the present invention.

For the n-pentacosane analysis, a sample of the compound was heated to 200° C. using a metal probe, as described above. FIG. 31 shows a mass spectrum generated by injection of metastable helium into the resulting vapor. The dominant peak represents a deprotonated molecular ion of n-pentacosane $[M-H]^+$ (m/z 351.4). The peak at m/z 214.1 is attributable to an impurity in the sample.

Figure 32:
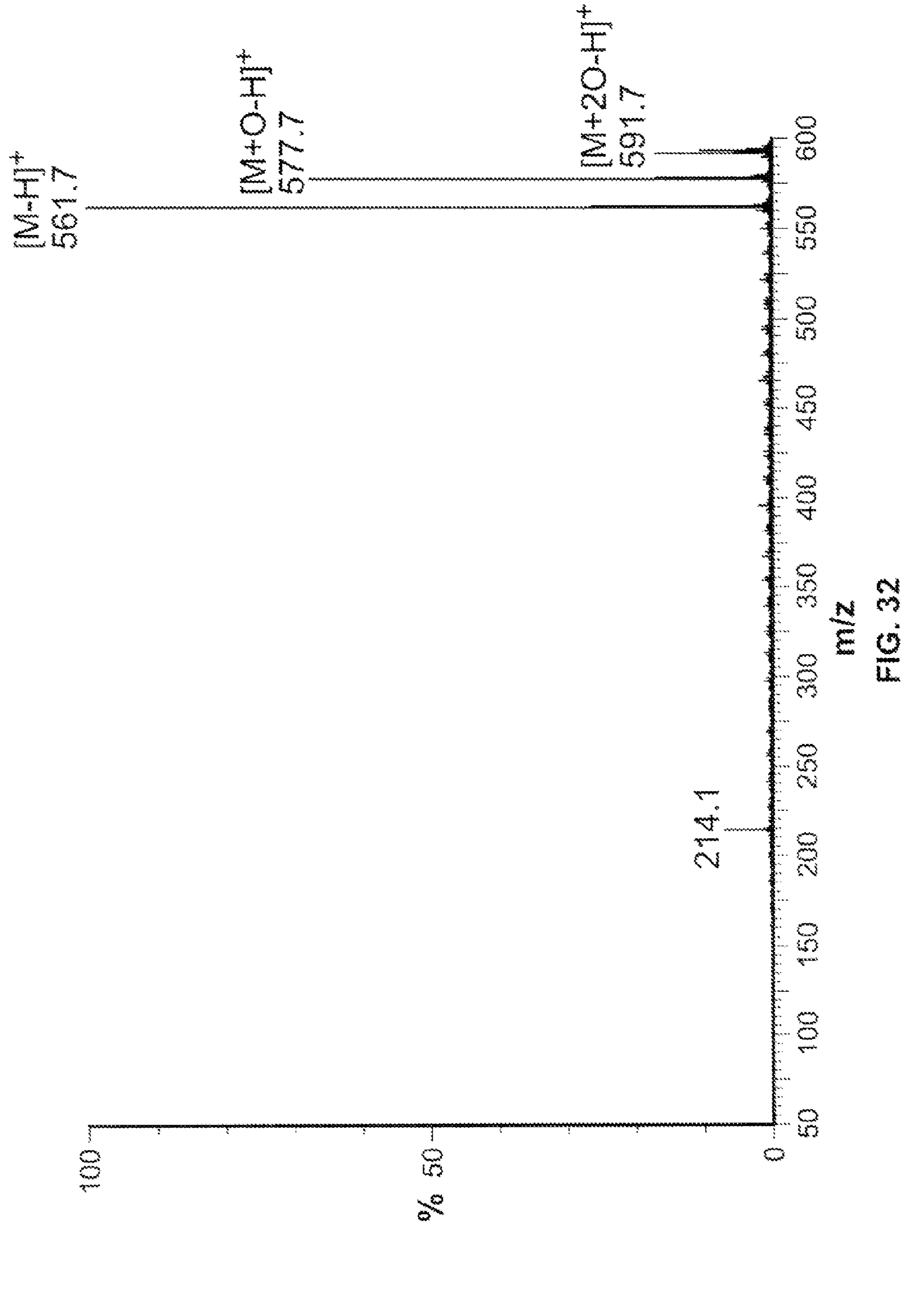
FIG. 32 shows a mass spectrum of n-tetracontane, generated with metastable helium according to an embodiment of the present invention.

For the n-tetracontane analysis, a sample of the compound was heated to 230° C. using a metal probe, as described above. FIG. 32 shows a mass spectrum generated by injection of metastable helium into the resulting vapor. The mass spectrum shows three peaks characteristic of n-tetracontane: a dominant deprotonated molecular ion $[M-H]^+$ (m/z 561.7) and two large peaks for molecular ions showing deprotonation and addition of oxygen (i.e., $[M+O—H]^+$ (m/z 577.7) and $[M+2O-3H]^+$ (m/z 591.7)). The small peak at m/z 214.1 is attributable to an impurity in the sample.

A partial list of compounds which have been characterized using DICE-reagent sprays according to embodiments of the present invention, including such compounds as have been discussed herein, are presented in Table 1, below.

TABLE 1

List of Compounds Evaluated by DICE Technique

| Compound | Amount deposited on Surface ($ng/mm^2$) | Detected m/z (Ion Type) | Approximate S/N intensity ratio of molecular ion peak |
|---|---|---|---|
| Vitamin K | 25 | 450 ($M^{+*}$), 451 $[MH]^+$ | 20:1 |
| Cholesterol | 25 | 386 ($M^{+*}$), 369 $[MH - H_2O]^+$ | 10:1 |
| Estradiol | 100 | 272 ($M^{+*}$), 255 $[MH - H_2O]^+$ | 20:1 |
| 2-Naphthol | 25 | 144 ($M^{+*}$), 145 $[MH]^+$ | 100:1 |
| 1,4-Hydroquinone | 100 | 110 ($M^{+*}$) | 20:1 |
| Anthracene | 25 | 178 ($M^{+*}$), 179 $[MH]^+$ | 100:1 |
| Vitamin A | 250 | 286 ($M^{+*}$), 269 $[MH - H_2O]^+$ | 20:1 |
| DL-α-Tocopherol | 25 | 430 ($M^{+*}$), 431 $[MH]^+$ | 20:1 |
| p-Aminobenzoic acid | 25 | 137 ($M^{+*}$), 138 $[MH]^+$ | 20:1 |
| Limonene | 250 | 136 ($M^{+*}$), 137 $[MH]^+$ | 10:1 |
| Thymol | 250 | 150 ($M^{+*}$), 151 $[MH]^+$ | 100:1 |
| Phenyl acetaldehyde | 250 | 120 ($M^{+*}$), 121 $[MH]^+]^+$ | 100:1 |
| Farnesyl acetate | 250 | 264 ($M^{+*}$), 265 $[MH]^+$ | 10:1 |
| Chlorophenol | 250 | 128/130 ($M^{+*}$) | 20:1 |
| Iodophenol | 250 | 220 ($M^{+*}$) | 50:1 |
| diHexyl ketone | 250 | 198 ($M^{+*}$), 199 $[MH]^+$ | 20:1 |
| p-Cresol | 250 | 108 ($M^{+*}$) | 100:1 |
| Benzaldehyde | 250 | 106 ($M^{+*}$), 105 $[M - H]^+$, 106 $[MH]^+$ | 10:1 |
| γ-terpinene | 250 | 136 ($M^{+*}$), 137 $[MH]^+$ | 50:1 |
| β-pinene oxide | 250 | 152 ($M^{+*}$), 153 $[MH]^+$ | 5:1 |
| β-Caryophyllene | 250 | 204 ($M^{+*}$), 205 $[MH]^+$ | 50:1 |
| Fluoranthene | 250 | 202 ($M^{+*}$), 203 $[MH]^+$ | 10:1 |
| Salicylaldoxime | 250 | 137 ($M^{+*}$), 138 $[MH]^+$ | 20:1 |
| Ferrocene | 250 | 187 ($M^{+*}$), 187 $[MH]^+$ | 100:1 |

Further embodiments of the present invention are presented in the following papers, each of which is incorporated by reference herein in its entirety along with its published supplemental materials: (1) Chan, C. et al., Desorption Ionization by Charge Exchange (DICE) for Sample Analysis under Ambient Conditions by Mass Spectrometry (J. Am. Soc. Mass Spectrom. (2010) 21, 1554-1560); (2) Chan, C. et al., Evading Metal Adduct Formation during Desorption-Ionization Mass Spectrometry, Rapid Commun. Mass Spectrom. (2010) 24, 2838-2842; and (3) Chan, C. et al., A Combined Desorption-Ionization by Charge Exchange (DICE) and Desorption-Electrospray Ionization (DESI) Source for Mass Spectroscopy (accepted for publication in J. Am. Soc. Mass Spectrom.).

It should be understood that the embodiments described herein and in the incorporated references are merely exemplary and that a person skilled in the art may make many variations and modifications thereto without departing from the spirit and scope of the present invention. For example, in one modification of an embodiment of the invention, analytes that are to be characterized are added directly to the solvent or solvent mixture before it enters the electrically-conductive capillary. In such an embodiment, techniques for separating analytes (e.g., liquid chromatography) may be used to separate analytes prior to ionization by a DICE method and their subsequent characterization by methods such as mass analysis (e.g., mass spectroscopy). In another modification of an embodiment of the invention, reagents may be added to the spray to evaluate chemical reactions at the surface of the sample being characterized. For example, a mixture of naphthol and hexane that has been subjected to reverse-phase chromatography can be added in-line to the DICE reagent, using, e.g., an apparatus such as apparatus 110 of FIG. 13. All such variations and modifications, not limited to those discussed above, are intended to be included within the scope of the invention, as defined by the claims presented below.

We claim:

1. A method of ionizing an analyte in a sample material using an apparatus having an electrically-conductive capillary with an inlet and an outlet, the outlet being situated within a nebulizer tube having a respective inlet and outlet such that the outlet of the capillary is proximate the outlet of the nebulizer tube, said method comprising the steps of injecting a liquid-phase reagent that includes an electrochemically-oxidizable nonpolar or low-polarity solvent into the inlet of the capillary while holding the capillary at a high electrical voltage and while injecting a chemically-inert gas into the inlet of the nebulizer tube, thereby generating a spray of the reagent that includes molecular ions of the solvent, and directing the spray onto the sample material, thereby desorbing and ionizing the analyte, wherein the solvent becomes electrochemically oxidized at the capillary, thereby forming the molecular ions of the solvent.

2. The method of claim 1, wherein the reagent further includes a polar solvent.

3. A method of ionizing an analyte in a sample material using an apparatus having an electrically-conductive capillary with an inlet and an outlet, the outlet being situated within a nebulizer tube having a respective inlet and outlet such that the outlet of the capillary is proximate the outlet of the nebulizer tube, said method comprising the steps of injecting a reagent that includes an electrochemically-oxidizable nonpolar or low-polarity solvent and helium into the inlet of the capillary while holding the capillary at a high electrical voltage and while injecting a chemically-inert gas into the inlet of the nebulizer tube, thereby generating a spray of the reagent that includes molecular ions of the solvent.

4. The method of claim 1, wherein the spray is directed onto the surface of the sample material, wherein the pressure in the environment of the sample material is nominally one atmosphere.

5. The method of claim 1, wherein the molecular ions are formed by removal of an electron from a molecule of the electrochemically-oxidizable solvent.

6. The method of claim 1, wherein said ionizing of the analyte occurs by charge exchange between the molecular ions and the analyte.

7. The method of claim 6, wherein the molecular ions of the solvent include molecular cations of the solvent.

8. The method of claim 1, wherein the ionized analyte is essentially free of alkali metal cations bound to the ionized analyte.

9. The method of claim 1, wherein the electrochemically-oxidizable non-polar or low-polarity solvent is a solvent comprising at least one aromatic organic compound.

10. The method of claim 9, wherein the molecular ions of the solvent include molecular ions of the at least one aromatic organic compound.

11. The method of claim 1, wherein the electrochemically-oxidizable non-polar or low-polarity solvent includes at least one of benzene, toluene, a xylene, a trimethylbenzene, a furan, a fullerene, and a fluoranthene.

12. The method of claim 1, wherein the electrochemically-oxidizable non-polar or low-polarity solvent consists essentially of one or more electrochemically-oxidizable nonpolar or low-polarity solvents.

13. The method of claim 1, wherein the chemically-inert gas includes nitrogen.

14. The method of claim 1, wherein the sample material is in a solid state.

15. The method of claim 3, wherein the spray of the reagent includes metastable helium.

* * * * *